United States Patent
Cho et al.

(10) Patent No.: US 12,040,652 B2
(45) Date of Patent: Jul. 16, 2024

(54) CHARGING MANAGEMENT CHIP FOR CHARGING BATTERY BASED ON SWITCHING CHARGING AND DIRECT CHARGING, AND OPERATING METHOD OF CHARGING MANAGEMENT CHIP

(71) Applicant: SAMSUNG ELECTRONICS CO., LTD., Suwon-si (KR)

(72) Inventors: Sungkyu Cho, Hwaseong-si (KR);
Minkyu Kwon, Hwaseong-si (KR);
Taesun You, Siheung-si (KR);
Sungwoo Lee, Hwaseong-si (KR);
Taejin Jeong, Incheon (KR);
Daewoong Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/990,647

(22) Filed: Nov. 18, 2022

(65) Prior Publication Data
US 2023/0080119 A1    Mar. 16, 2023

Related U.S. Application Data

(63) Continuation of application No. 16/847,840, filed on Apr. 14, 2020, now Pat. No. 11,509,157.

(30) Foreign Application Priority Data

Sep. 11, 2019    (KR) ........................ 10-2019-0113024

(51) Int. Cl.
*H02J 7/00*    (2006.01)

(52) U.S. Cl.
CPC .... *H02J 7/007182* (2020.01); *H02J 7/00032* (2020.01); *H02J 2207/20* (2020.01)

(58) Field of Classification Search
None
See application file for complete search history.

(56) References Cited

U.S. PATENT DOCUMENTS

| | | |
|---|---|---|
| 5,721,481 A | 2/1998 | Narita et al. |
| 7,274,116 B2 | 9/2007 | Inoue et al. |
| 7,936,147 B2 | 5/2011 | Kook |
| 8,687,392 B2 | 4/2014 | Sims et al. |

(Continued)

FOREIGN PATENT DOCUMENTS

KR    10-2012-0107323 A    10/2012

*Primary Examiner* — Arun C Williams
(74) *Attorney, Agent, or Firm* — Sughrue Mion, PLLC

(57) ABSTRACT

A charging management chip includes a switching charging circuit and a direct charging circuit. The switching charging circuit receives charging power, and passes through the charging power to a first node, and charges a battery according to a switching charging method and controls generation of a system voltage provided to an electronic system. The direct charging circuit receives the charging power applied to the first node via an input node, and charges the battery according to a direct charging method by providing the charging power to an output node based on a switching circuit therein. The switching charging circuit charges the battery through a first charging path including an inductor arranged outside the charging management chip, and the direct charging circuit charges the battery through a second charging path through which the charging power transferred to the output node is directly provided to the battery.

26 Claims, 20 Drawing Sheets

(56) References Cited

U.S. PATENT DOCUMENTS

| | | |
|---|---|---|
| 8,823,319 B2 | 9/2014 | Von Novak, III et al. |
| 9,692,253 B2 | 6/2017 | Jeong et al. |
| 10,044,213 B2 | 8/2018 | Barsukov et al. |
| 10,250,151 B1 | 4/2019 | Wu |
| 2004/0164707 A1 | 8/2004 | Veselic et al. |
| 2016/0087462 A1 | 3/2016 | Kudo et al. |
| 2017/0126039 A1 | 5/2017 | Nguyen |
| 2018/0301911 A1 | 10/2018 | Cho et al. |

CHARGING MANAGEMENT CHIP FOR CHARGING BATTERY BASED ON SWITCHING CHARGING AND DIRECT CHARGING, AND OPERATING METHOD OF CHARGING MANAGEMENT CHIP

CROSS-REFERENCE TO RELATED APPLICATION

This application is a continuation application of U.S. application Ser. No. 16/847,840, filed on Apr. 14, 2020, which claims priority from Korean Patent Application No. 10-2019-0113024, filed on Sep. 11, 2019, in the Korean Intellectual Property Office, the contents of each of which being incorporated by reference herein in their entireties.

BACKGROUND

1. Field

The present disclosure relates to a charging management chip, and more particularly, to a charging management chip for charging a battery based on a switching charging and direct charging method, and an operating method of the charging management chip.

2. Description of Related Art

Electronic systems such as mobile devices or portable devices use batteries to supply power. Various methods are used to charge the batteries. For example, the batteries may be directly charged by a direct charging method using chargers that support direct charging, or the batteries may be charged by a switching charging method using general chargers. In general, the direct charging method may have a higher charging efficiency than the switching charging method.

However, charging circuits for the direct charging method and the switching charging method need to be provided separately in an electronic system. In general, the charging circuit for the direct charging method and the charging circuit for the switching charging method may be implemented in separate chips. In this case, the number of semiconductor chips mounted in the electronic system is increased to support the direct charging and switching charging methods, and accordingly, a size of the electronic system is increased also.

SUMMARY

It is an aspect to provide a charging management chip in which a direct charging circuit and a switching charging circuit are embedded, and an operation method of the charging management chip.

According to an aspect of an example embodiment, there is provided a charging management chip comprising a switching charging circuit configured to receive charging power from an external charger and pass through the charging power to a first node, and configured to charge a battery according to a switching charging method and control generation of a system voltage provided to an electronic system comprising the charging management chip; and a direct charging circuit configured to receive the charging power applied to the first node via an input node, and configured to charge the battery according to a direct charging method by providing the charging power to the battery via an output node based on a switching operation of a switching circuit therein, wherein the switching charging circuit charges the battery through a first charging path comprising an inductor arranged outside the charging management chip, and the direct charging circuit charges the battery through a second charging path through which the charging power transferred to the output node is provided directly to the battery.

According to an aspect of an example embodiment, there is provided a charging management chip configured to control a charging operation for a battery, the charging management chip comprising a switching charging circuit comprising a first input switch configured to transfer, to a first node, charging power provided from an external charger, the switching charging circuit being connected via a second node to one node of an inductor arranged outside the charging management chip and arranged in a switching charging path, the switching charging circuit being connected via a third node to a node corresponding to another end of the inductor and configured to provide a system voltage, the switching charging circuit being configured to charge the battery by providing the charging power to the battery when the switching charging circuit is connected to the battery via a fourth node; and a direct charging circuit configured to receive the charging power transmitted via the first input switch at an input node that is connected to the first node, the direct charging circuit being configured to charge the battery by directly providing the charging power via an output node to the battery according to a switching state of a switching circuit connected between the input node and the output node, wherein while the direct charging circuit operates in a direct charging mode, the switching charging circuit operates in a switching charging mode of charging the battery according to a switching charging method or in a buck mode of generating the system voltage According to an aspect of an example embodiment, there is provided an operation method of a charging management chip, the operation method comprising in response to an external charger being connected, charging a battery based on a switching charging method by using a switching charging circuit comprised in the charging management chip; determining whether the external charger supports a direct charging function; in response to determining that the external charger supports the direct charging function, passing through charging power provided to the switching charging circuit to an input node of a direct charging circuit provided in the charging management chip; charging the battery based on a direct charging method by dividing the charging power transferred to the input node and providing the divided charging power to the battery via an output node of the direct charging circuit; and in response to a voltage of the battery reaching a certain set level, terminating the direct charging method and changing a charging mode such that the battery is charged based on the switching charging method.

According to an aspect of an example embodiment, there is provided a charging management chip comprising a switching charging circuit configured to receive charging power from an external charger, and to charge a battery through an inductor connected externally to the charging management chip according to a switching charging method and control generation of a system voltage provided to an electronic system comprising the charging management chip; and a direct charging circuit configured to charge the battery according to a direct charging method by providing the charging power directly to the battery without passing through a passive component, wherein the switching charging circuit passes through the charging power to the direct charging circuit to charge the battery according to the direct charging method.

BRIEF DESCRIPTION OF THE DRAWINGS

Various example embodiments will be more clearly understood from the following detailed description taken in conjunction with the accompanying drawings, in which.

DETAILED DESCRIPTION

Hereinafter, example embodiments are described in detail with reference to the accompanying drawings.

Figure 1:
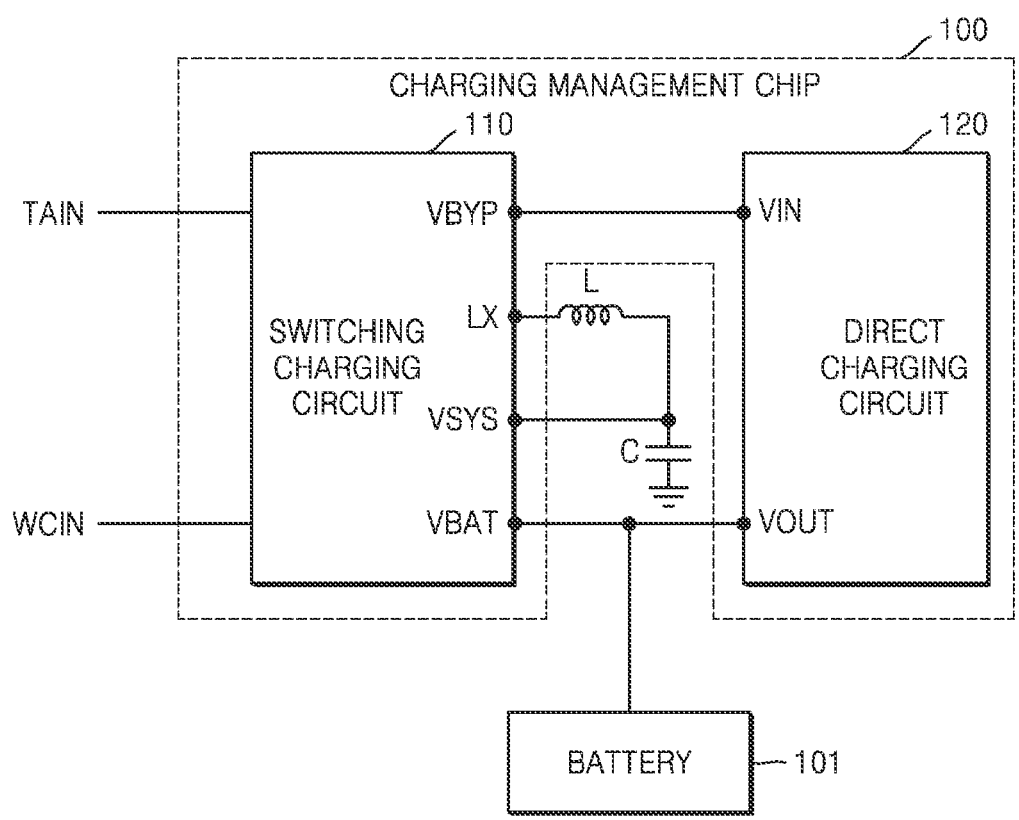
FIG. 1 is a block diagram illustrating a charging management chip according to an example embodiment.

FIG. 1 is a block diagram illustrating a charging management chip according to an example embodiment. In FIG. 1, a charging management chip 100 and a battery 101 connected thereto are further illustrated, and the charging management chip 100 and the battery 101 may be components included in an electronic system (or an electronic device).

The charging management chip 100 may be implemented in various forms. For example, the charging management chip 100 may be implemented as one semiconductor device (or a semiconductor chip or a semiconductor package).

According to example embodiments, the charging management chip 100 may include a switching charging circuit 110 and a direct charging circuit 120, and when the charging management chip 100 is implemented as one semiconductor chip, various circuits included in the switching charging circuit 110 and the direct charging circuit 120 may be formed on one semiconductor substrate. In other words, various circuits included in the switching charging circuit 110 and the direct charging circuit 120 may be formed on the same semiconductor substrate. In addition, the circuits included in the switching charging circuit 110 and the direct charging circuit 120 may be formed on the same semiconductor substrate by using the same semiconductor process.

The charging management chip 100 may be mounted on a board (not illustrated) in the electronic system, and when the charging management chip 100 is mounted on the board in the electronic system, the charging management chip 100 may be connected to one or more circuit elements arranged in connection with a charging operation. For example, as illustrated in FIG. 1, the charging management chip 100 may be connected to an inductor L, a capacitor C, or the like. In other words, according to an example embodiment, the inductor L and the capacitor C, among the components illustrated in FIG. 1, may be arranged outside the charging management chip 100 corresponding to one semiconductor chip.

The charging management chip 100 according to various example embodiments may be applied to various types of electronic systems. For example, the charging management chip 100 may be included in various types of electronic systems such as a smartphone, a tablet personal computer, a mobile phone, a video phone, an e-book reader, and a desktop personal computer, a laptop personal computer (PC), a netbook computer, a workstation, a server, a personal digital assistant (PDA), a portable multimedia player (PMP), an MP3 player, a mobile medical device, a camera, or a wearable device.

The charging management chip 100 may be connected to a wired charger and/or a wireless charger of the outside the charging management chip 100 or the electronic device or electronic system in which the charging management chip 100 is included, and may receive power from the wired charger and/or the wireless charger. According to embodiments, the wired charger may be referred to as a travel adapter (TA), and accordingly, terms of the wired charger and terms of the TA may be used interchangeably. In addition, charging power sources to be mentioned in the following embodiments may be used with various meanings. For example, a power provided from a charger may represent a charging power, or some of the power actually provided to the battery 101 may represent a charging power.

In an embodiment, the electronic system employing the charging management chip 100 may include a wired interface TAIN and a wireless interface WCIN. Power from the wired charger may be provided via the wired interface TAIN to the charging management chip 100, and power from the wireless charger may be provided via the wireless interface WCIN to the charging management chip 100. At least some of the power from the wired charger and the wireless charger may be used as the charging power to charge the battery 101.

The wired interface TAIN may include various types of connectors such as a universal serial bus (USB), and may be connected to an external wired charger via the connector. In addition, the wireless interface WCIN may include a coil (for example, a conductive pattern) and a wireless charging integrated circuit (IC), and may wirelessly transmit and receive power to/from a wireless charger such as a charging pad.

The charging management chip 100 may charge the battery 101 by using various methods such as a normal charging method, a fast charging method, and a direct charging method. For example, the switching charging circuit 110 may charge the battery 101 in the normal charging method and the fast charging method, and the direct charging circuit 120 may charge the battery 101 in the direct charging method. The direct charging method may be a method of directly supplying, to the battery 101, the power provided by the wired charger and/or the wireless charger (which may be collectively referred to as a charger according to embodiments), and may improve power efficiency and accordingly, reduce heat and a charging time of the battery 101. Here, directly supplying the power provided by the wired charger and/or the wireless charger may denote that the power is supplied to the battery directly without passing through a frequency component, such as an inductor or capacitor.

For example, the charger may support only a normal charging function or a fast charging function, and the switching charging circuit 110 may perform normal charging to support a charging capacity of about 5 W to about 15 W depending on a type of the charger, or perform a fast charging function to support a charging capacity of about 15 W to about 20 W, and in the case of the switching charging method, may have a charging efficiency of about 90% to about 93%. When the charger supports a direct charging function, the direct charging circuit 120 may perform direct charging with a charging efficiency of about 96% to about 98%, and since the charging efficiency of the direct charging is higher, heat dissipation characteristics may also be improved.

In the switching charging method, a charging operation of the battery 101 may be performed based on a constant voltage control and a constant current control. In the direct charging method, the charging operation of the battery 101 may be performed mainly based on the constant current control. However, it is difficult to precisely control a charge amount (i.e., a voltage of a battery) of the battery 101 by using a constant voltage control. Therefore, in the direct charging method, even when a dedicated charger for supporting the direct charging function is connected to the electronic system, it may be required to charge the battery 101 by using the direct charging method and the switching charging method together.

Each of the switching charging circuit 110 and the direct charging circuit 120 may include a charging path for transferring the charging power from the charger to the battery 101. As an example, the switching charging circuit 110 or the direct charging circuit 120 may selectively charge the battery 101, or the switching charging circuit 110 and the direct charging circuit 120 may charge the battery 101 together. In other words, only one of the switching charging circuit 110 or the direct charging circuit 120 may charge the battery 101, or both of the switching charging circuit 110 and the direct charging circuit 120 may charge the battery 101. For example, the switching charging circuit 110 may include a first node VBYP to which the charging power is passed through to directly provide the charging power from the charger to an input node VIN of the direct charging circuit 120. In other words, the switching charging circuit 110 passes through the charging power from the charger directly to the direct charging circuit 120 via the first node VBYP thus bypassing other components of the switching charging circuit 110.

The switching charging circuit 110 may further include a second node LX, a third node VSYS, and a fourth node VBAT. In a switching charging operation, the charging power may be provided to the battery 101 through a first charging path via the second node LX, the inductor L, the third node VSYS, and the fourth node VBAT. The third node VSYS may be connected to a system voltage Vsys (see FIG. 2) provided to a circuit block inside and/or outside the charging management chip 100. In addition, the inductor L may be connected between the second node LX and the third node VSYS, and the capacitor C may be connected between the third node VSYS and a ground. The fourth node VBAT may output a voltage for charging the battery 101.

The direct charging circuit 120 may include the input node VIN and an output node VOUT. The input node VIN may be connected to the first node VBYP of the switching charging circuit 110, and the output node VOUT may be connected to the battery 101. In the direct charging method, the charging power received via the input node VIN may be directly provided to the battery 101 via the output node VOUT. In other words, the charging power in the direct charging method may be provided through an input circuit of the switching charging circuit 110, and accordingly, the input circuits of the charging power for switching charging and direct charging may be shared. In addition, the output node VOUT of the direct charging circuit 120 may be directly connected to the battery 101. For example, the charging path of the direct charging method may include a path that does not include a passive element such as an external inductor or an external capacitor.

According to an example embodiment, the switching charging circuit 110 and the direct charging circuit 120 may include circuits for switching the charging power, and components (not illustrated) for controlling the circuits may be integrated together in a semiconductor chip corresponding to the charging management chip 100. In addition, since the charging management chip 100 is implemented as one semiconductor chip, the charging management chip 100 may include one or more terminals connected to external devices. In other words, one or more pins of the charging management chip 100 may be connected to external devices. For example, the charging management chip 100 may include terminals connected to the wired interface TAIN and the wireless interface WCIN, terminals connected to external circuits (for example, the inductor L, the capacitor C, etc.), and terminals connected to the battery 101.

According to an example embodiment, since the switching charging circuit 110 and the direct charging circuit 120 may be integrated in one semiconductor chip, and the input circuit of the charging power for the switching charging and the direct charging may be shared, the size of the charging management chip 100 may be reduced, and in addition, the size of a mobile device or a portable device employing the charging management chip 100 may be reduced.

In example embodiments, the battery 101 may include a nickel-cadmium (Ni—Cd) battery, a nickel-hydride (Ni-MH) battery, a lithium ion battery, or the like, but example embodiments are not limited thereto.

Figure 2:
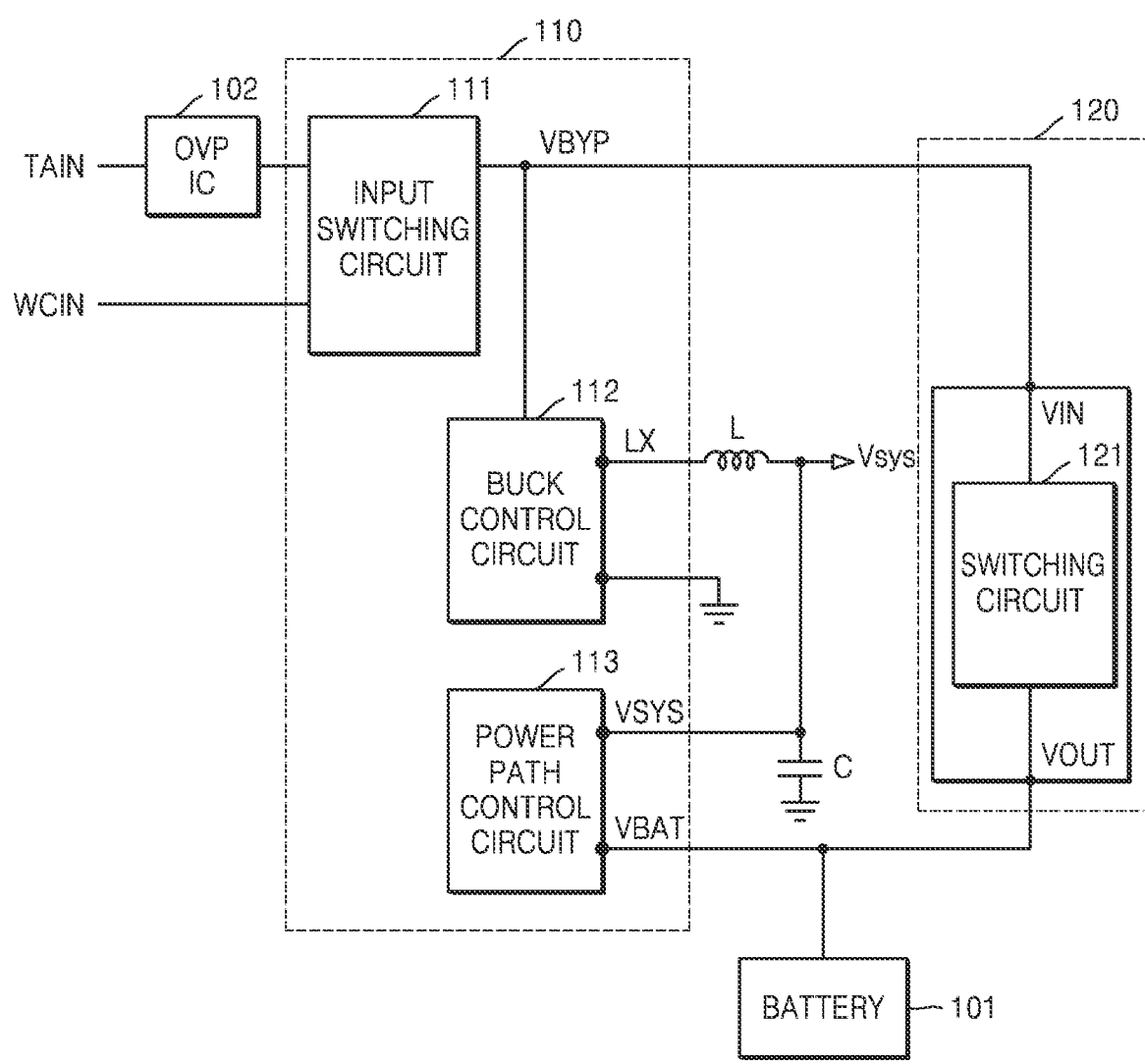
FIG. 2 is a block diagram illustrating an example implementation of the charging management chip of FIG. 1.

FIG. 2 is a block diagram illustrating an example implementation of the charring management chip 100 of FIG. 1.

Referring to FIGS. 1 and 2, the switching charging circuit 110 may include an input switching circuit 111, a buck control circuit 112, and a power path control circuit 113. In addition, the direct charging circuit 120 may include a switching circuit 121 connected between the input node VIN and the output node VOUT. In addition, according to the above-described example embodiment, the charging management chip 100 may be connected to circuit elements related to charging of the battery 101, and as an example, an inductor L and a capacitor C connected to one or more nodes of the switching charging circuit 110 may be further illustrated.

As illustrated in FIG. 2, an over voltage protection circuit (OVP) IC 102 may be further included in the electronic system, and the charging power from the wired charger may be provided to the charging management chip 100 via the OVP IC 102. As an implementation example, the OVP IC 102 may be implemented as a separate semiconductor chip, and accordingly, the OVP IC 102 may be outside the charging management chip 100. When a voltage provided from the wired charger corresponds to an over voltage, the OVP IC 102 may prevent damage to circuits inside the charging management chip 100 by blocking the power from the wired charger from being provided to the charging management chip 100.

The input switching circuit 111 may include one or more switches to switch the charging power from the wired charger and the wireless charge into the charging management chip 100. According to a configuration of the one or more switches and a switch on/off state of the switches, the input switching circuit 111 may provide the charging power to the buck control circuit 112, or may pass through the charging power to provide the charging power directly to the direct charging circuit 120 via the first node VBYP, while bypassing the buck control circuit 112 and the power path control circuit 113 of the switching charging circuit 110.

The buck control circuit 112 may control an operation of converting the charging power received via the input switching circuit 111 into a voltage or current of a level suitable for charging the battery 101, and in addition, may control an operation of converting the charging power from the battery 101 into a voltage or current at a level suitable for being used inside the electronic system. As an example, the buck control circuit 112 may include one or more switches, and may control the charging operation or an operation of generating the system voltage Vsys by controlling the switches according to various modes. The buck control circuit 112 may be connected to one end of an inductor L outside the charging management chip 100 via the second node LX, and may provide the charging power to the second node LX via a switching operation.

The power path control circuit 113 may control a power path such that the charging power provided from the charger is provided to the battery 101, or may perform an operation of controlling a power path such that the power from the battery 101 is provided to the system voltage Vsys used inside the electronic system. The power path control circuit 113 may be connected to the third node VSYS and the fourth node VBAT, and perform the operation of controlling the power path.

As an example, the power path control circuit 113 may include one or more switches, and provide a portion of the power provided from the charger to the battery 101 as the charging power, and may control the power path such that the other portion of the power is provided as the system voltage Vsys used inside the electronic system. As an operation example, when the power of the electronic system is turned off, the power supplied from the charger may be provided to the battery 101 as the charging power, and when the power of the electronic system is on, some of the power provided from the charger may be provided to the battery 101 as the charging power, and some of the power provided from the charger may be provided to the electronic system as the system voltage Vsys.

The switching circuit 121 included in the direct charging circuit 120 may include one or more switches, and according to the switching state of the switching circuit 121, an electrical circuit between the input node VIN and the output node VOUT may be controlled. As an example, in some example embodiments, the direct charging circuit 120 may perform a function of a voltage divider (or a capacitor divider), divide the charging power applied to the input node VIN, and provide the divided charging power to the output node VOUT and thus to the battery 101. However, this is only an example, and the switching circuit 121 may be implemented in various forms. Depending on the implementation type of the switching circuit 121, a power of the same level as the charging power provided to the input node VIN may be provided to the output node VOUT, or a power of a different level from the charging power provided to the input node VIN may be provided to the output node VOUT.

According to the embodiment illustrated in FIG. 2, the input switching circuit 111 may be used as a circuit for receiving the charging power in common in the switching charging operation and the direct charging operation, and accordingly, the size of the charging management chip 100 that is implemented as one semiconductor chip (100) may be reduced. In addition, various charging modes using the switching charging circuit 110 and the direct charging circuit 120 in one semiconductor chip may be supported, and accordingly, the charging operation for the battery 101 may be selectively performed by any one of the switching charging circuit 110 and the direct charging circuit 120, or the charging operation for the battery 101 may be performed by both the switching charging circuit 110 and the direct charging circuit 120.

As described above, the various components illustrated in FIG. 2 may include one or more switches, and the switches may be controlled by control signals (not illustrated in FIG. 2) generated in the charging management chip 100. As an example, the charging management chip 100 may include circuits for generating a control signal according to a voltage/current detected from various nodes therein, or according to the detection result of the voltage/current of the battery 101, and based on the detection result of the voltage/current, various switches in the charging management chip 100 may be controlled. For example, the circuits for generating the control signal may be implemented as hardware logic circuits, or may be implemented as a microprocessor that accesses a memory to execute various codes for generating the control signal.

Figure 3:
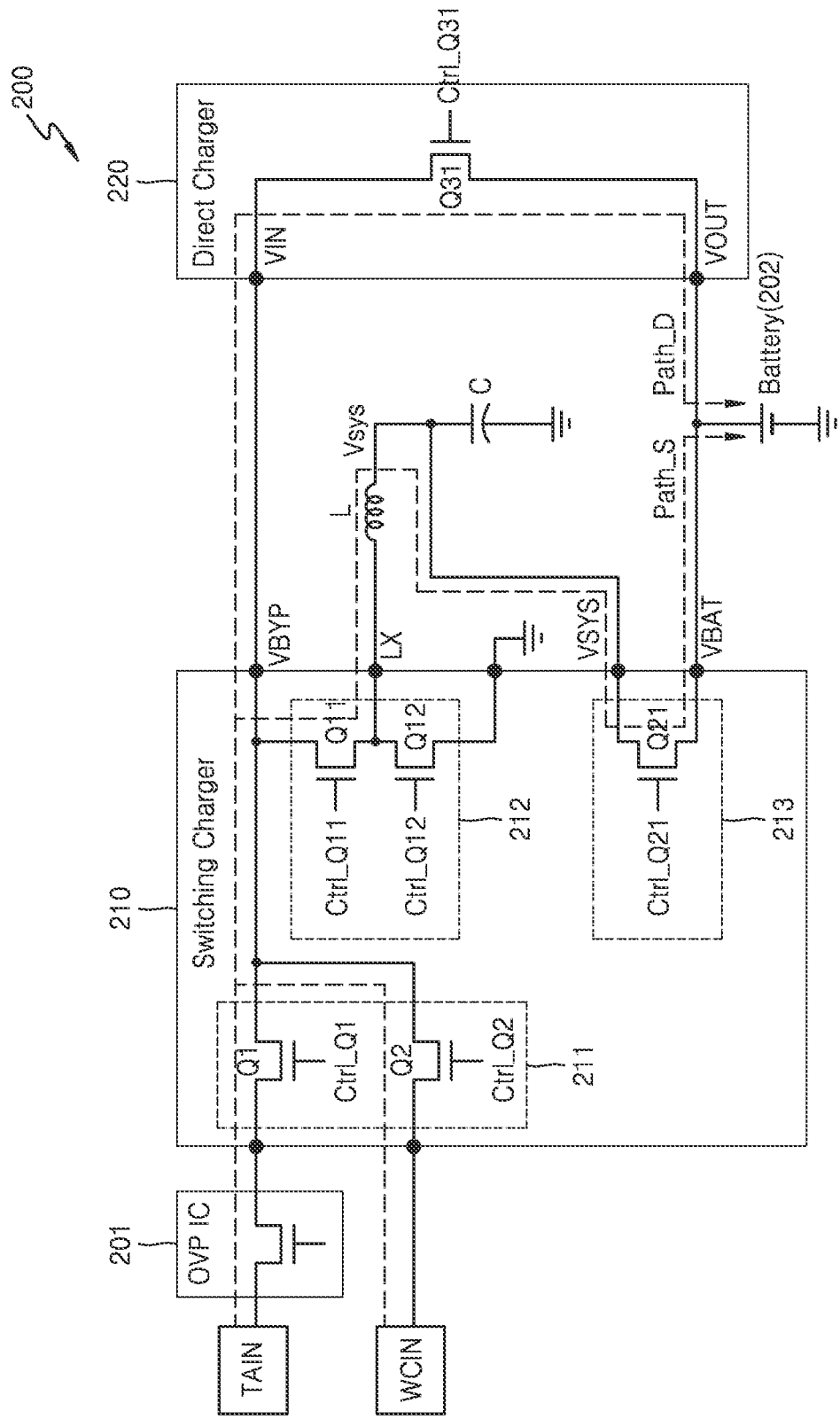
FIG. 3 is a circuit diagram illustrating an example implementation of a charging management chip, according to example embodiments.

FIG. 3 is a circuit diagram illustrating an example implementation of a charging management chip 200 according to example embodiments. The circuit diagram illustrated in FIG. 3 merely illustrates one implementation example of a charging management chip, and a specific circuit design may have a somewhat modified form in performing a charging function according to example embodiments.

Referring to FIG. 3, the charging management chip 200 may be implemented as a single semiconductor chip, and may include a switching charging circuit 210 and a direct charging circuit 220. In addition, the switching charging circuit 210 may include an input switch circuit 211, a buck control circuit 212, and a power path control circuit 213, and the direct charging circuit 220 may include a switching circuit Q31. In addition, the charging management chip 200 may be connected to the wired interface TAIN communicating with a wired charger and the wireless interface WCIN communicating with a wireless charger. In addition, FIG. 3 illustrates an example in which an OVP IC 201 is outside the charging management chip 200 as in the example embodiment illustrated in FIG. 2, and a charging power via the wired interface TAIN may be provided to the charging management chip 200 via the OVP IC 201. In addition, additional circuit elements may be used in relation with the charging operation for a battery 202, and the inductor L, the capacitor C, and the like illustrated in FIG. 3 may be components arranged outside the charging management chip 200.

As in the example embodiment illustrated in FIG. 2, each of the input switch circuit 211, the buck control circuit 212, and the power path control circuit 213 may include one or more switches. As an example, the input switch circuit 211 may include a first input switch Q1 for transferring the charging power received via the wired interface TAIN and a second input switch Q2 for transferring the charging power received via the wireless interface WCIN. In addition, the buck control circuit 212 may include one or more switches connected in series between an output of the input switch circuit 211 and a ground, and as an example, may include a first buck control switch Q11 and a second buck control switch Q12. A node between the first and second buck control switches Q11 and Q12 may be connected to the second node LX.

The power path control circuit 213 may include a path control switch Q21, and the path control switch Q21 may be connected between the third node VSYS and the fourth node VBAT. The path control switch Q21 may be connected to a node to which the system voltage Vsys is applied via the third node VSYS, and may be connected to the battery 202 via the fourth node VBAT. In addition, according to a switching state of the path control switch Q21 in conjunction with other switches, a first charging path Path_S according to the switching charging method may be formed. For example, the first charging path Path_S may extend from the wired interface TAIN and the wireless interface WCIN through the inductor L to the battery, as illustrated in FIG. 3.

Various control signals for controlling the switches (Q1, Q2, Q11, Q12, and Q21) included in the switching charging circuit 210 may be generated in the charging management chip 200. According to the example embodiment illustrated in FIG. 2, various control signals may be generated based on detection results of voltage/current levels of various nodes in the charging management chip 200 and/or nodes connected to the battery 202. In FIG. 3, control signals (Ctrl_Q1 and Ctrl_Q2) provided to the input switching circuit 211, control signals (Ctrl_Q11 and Ctrl_Q12) provided to the buck control circuit 212, and a control signal Ctrl_Q21 provided to the power path control circuit 213 are illustrated.

When charging is performed according to the direct charging method, the direct charging circuit 220 may receive the charging power via wirings inside the first node VBYP and the charging management chip 200, and the input node VIN and the output node VOUT may be electrically connected to each other based on the switching operation of the switch provided in the switching circuit (for example, a direct charging switch Q31), and accordingly, a second charging path Path_D according to the direct charging method may be formed, and the charging power may be provided to the battery 202. For example, the second charging path Path_D may extend from the wired interface TAIN and the wireless interface WCIN through the input node VIN and the output node VOUT to the battery, as illustrated in FIG. 3. In FIG. 3, a control signal Ctrl_Q31 corresponding to one direct charging switch Q31 is illustrated in the switching circuit, but in some embodiments a larger number of switches may be provided in the switching circuit.

Figure 4:
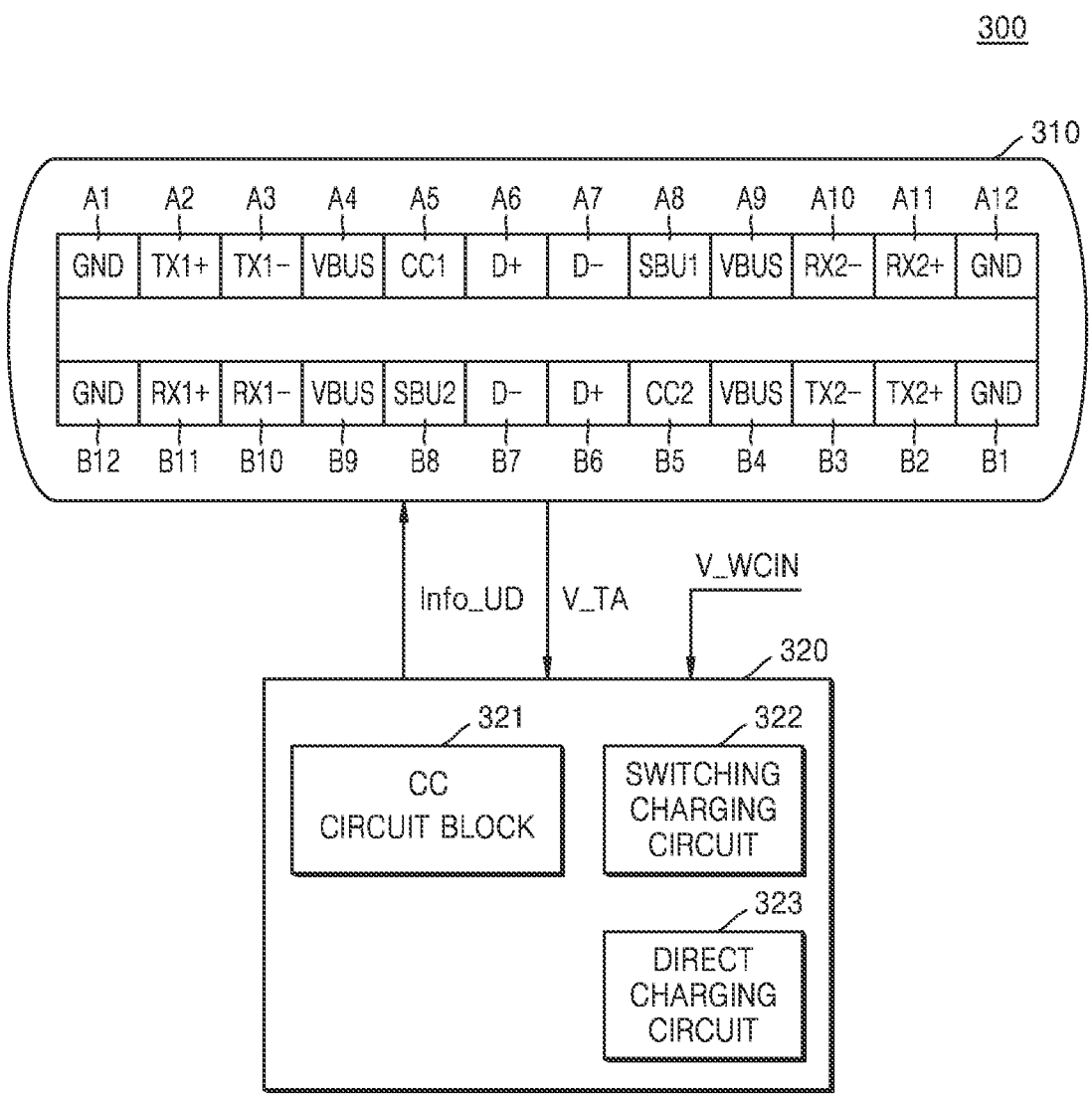
FIG. 4 is a block diagram illustrating an implementation example of a charging management chip receiving power from a Universal Serial Bus (USB) Type-C connector, according to an example embodiment.

FIG. 4 is a block diagram illustrating an implementation example of a charging management chip 320 receiving power from a connector 310 of a Universal Serial Bus (USB) Type-C structure. As an example, FIG. 4 illustrates an electronic system 300 including the connector 310 of the USB Type-C structure and the charging management chip 320 according to an example embodiment. Various terms described related with the USB Type-C structure in FIG. 4 may be easily understood by those of ordinary skill in the art by referring to the USB Type-C specification, and thus detailed descriptions thereof are omitted for conciseness.

Referring to the electronic system 300 of FIG. 4, the connector 310 of the USB Type-C structure may be a component provided in the wired interface in the above-described embodiments. In addition, the pins included in the connector 310 of the USB Type-C structure may have a symmetrical structure. In other words, when the wired charger is connected to the connector 310, the wired charger may be connected regardless of a directional characteristic of the wired charger due to the symmetrical structure.

The connector 310 may include two rows of pins. For example, the connector 310 may include pins of a first row (A1 through A12) and pins (B1 through B12) of a second row, and may support data communication at various speeds. For example, the connector 310 may include pins (A2 and A3, A10 and A11, B2 and B3, and B10 and B11) that support high-speed data communication according to a first standard (for example, USB 3.1), and pins (A6 and A7, and B6 and B7) that support low-speed data communication according to a second standard (for example, USB 2.0) In addition, each of pins of the first row (A1 through A12) and pins of the second row (B1 through B12) may perform a unique function. For example, VBUS pins (A4, A9, B4, and B9) may correspond to a power supply pin, GND pins (A1, A12, B1, and B12) may correspond to the pins transferring the ground voltage, and sideband use (SBU) pins (A8 and B8) may be used to support an alternate (ALT) mode and may be used in cables including Thunderbolt, DisplayPort, HDMI, etc.

The electronic system 300 including the connector 310 may perform bi-directional communication. As an example, when the electronic system 300 is connected to an external device via the connector 310, the electronic system 300 may operate as a host (for example, a downstream facing port (DFP)) or as a slave (an upstream facing port (UFP)). Alternatively, the electronic system 300 described above may operate as a dual role port (DRP), and in this case, the system 300 may adaptively change a role of the host (DFP) or the slave (UFP).

The role of the electronic system 300 as described above may be designated via configuration channels (CC) pins (A5 and B5) of the connector 310. As an example, in the case of the USB interface, data connection and control may be performed by digital communication via a CC1 pin A5 and a CC2 pin B5.

The charging management chip 320 may receive a charging power V_TA via the connector 310, and for example, may receive the charging power V_TA via various pins (for example, the VBUS pins) of the connector 310. The charging management chip 320 may include a configuration channels (CC) circuit block 321, a switching charging circuit 322, and a direct charging circuit 323. The charging management chip 320 may further receive a charging power V_WCIN provided from a wireless charger (not illustrated) along with receiving the charging power V_TA via the connector 310.

The CC circuit block 321 may be connected to at least one pin of the connector 310, and for example, may be connected to the CC1 pin A5 and the CC2 pin B5. As described above, the CC circuit block 321 may communicate with an external device (for example, a wired charger) via the connector 310, and provide various pieces of information to the external device. For example, the CC circuit block 321 may provide level adjustment information Info_UD via the connector 310 to the wired charger for adjusting a level of the charging power V_TA provided from the wired charger, and accordingly, may receive the charging power V_TA a level of which has been adjusted.

A charging process for a battery may perform an operation according to a certain charging profile, and the certain charging profile may include various charging modes. As an example, when it is assumed that the battery is charged by the wired charger, the level of the charging power V_TA may be increased or stepped down according to the charging profile, and since the CC circuit block 321 provides the level adjustment information Info_UD to the wired charger, the level of the charging power V_TA may be changed. As an example, the level of the voltage of the battery or a level of the current provided to the battery may need to be maintained at a level within a certain range, and based on the detection result of the voltage and/or current of the battery, the level of the charging power supply V_TA may be increased or decreased by providing the level adjustment information Info_UD to the wired charger.

FIG. 4 illustrates an example in which the charging management chip 320 is connected to the connector 310 of the USB Type-C structure. However, example embodiments are not limited thereto and may be applied to connectors of various other structures.

Figure 5:
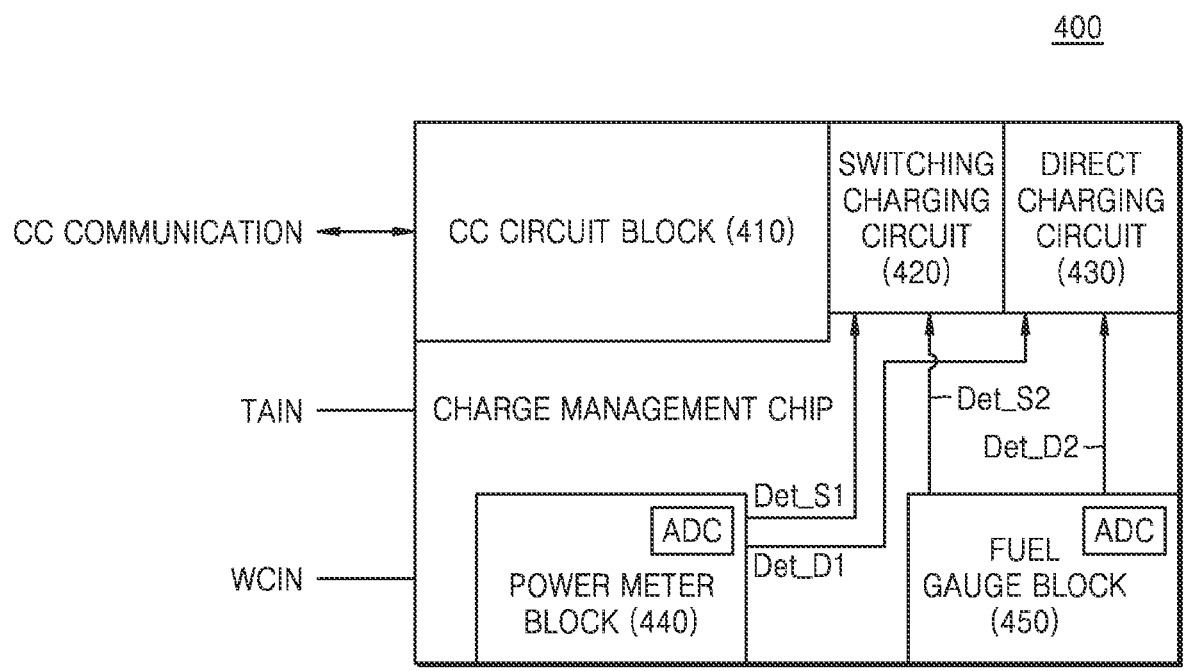
FIG. 5 is a block diagram illustrating a semiconductor chip according to an example embodiment.

FIG. 5 is a block diagram illustrating a semiconductor chip 400 according to an example embodiment. In FIG. 5, the semiconductor chip 400 in which various other functions are integrated together with the above-described circuits for the switching charging and direct charging is illustrated, and the semiconductor chip 400 may be referred to as a charging management chip as in the above-described example embodiments.

Referring to FIG. 5, the semiconductor chip 400 may include a CC circuit block 410, a switching charging circuit 420, a direct charging circuit 430, a power meter block 440, and a fuel gauge block 450. The CC circuit block 410 may be connected to a connector (not illustrated) based on a USB type according to the example embodiment illustrated in FIG. 4, and may be connected to an external device (for example, a wired charger) via a connector. According to an embodiment, the CC circuit block 410 may be connected to the CC1 and CC2 pins A5 and B5 of a connector of the USB Type-C structure, and may perform CC communication with a wired charger. Each of the switching charging circuit 420 and the direct charging circuit 430 may be implemented according to the above-described embodiments, and accordingly, the switching charging circuit 420 may charge a battery via the first charging path Path_S according to the switching charging method, and the direct charging circuit 430 may charge the battery via the second charging path Path_D according to the direct charging method.

The power meter block 440 and the fuel gauge block 450 may detect voltages, currents, and the like of various nodes in the semiconductor chip 400, and may output the detection results. For example, the power meter block 440 and the fuel gauge block 450 may detect the voltage, current, and the like of the battery, and may output the detection results. As an example, each of the power meter block 440 and the fuel gauge block 450 may include an analog-to-digital converter (ADC), and may convert the detection result of the voltage and current into a digital signal and output the digital signal. As an example, the power meter block 440 may provide detection results (Det_S1 and Det_D1) to the switching charging circuit 420 and the direct charging circuit 430, and the fuel gauge block 450 may provide detection results (Det_S2 and Det_D2) to the switching charging circuit 420 and the direct charging circuit 430.

As an implementation example, each of the switching charging circuit 420 and the direct charging circuit 430 may include a hardware circuit block to operate the switches according to a certain charging profile, and by using the hardware circuit block, control signals corresponding to the detection results (Det_S1, Det_D1, Det_S2, and Det_D2) from the power meter block 440 and the fuel gauge block 450 may be generated to control the switches included in the switching charging circuit 420 and the direct charging circuit 430.

As one of other various implementation examples, the control signals from each of the power meter block 440 and the fuel gauge block 450 may be used as control signals for controlling the switches provided in the switching charging circuit 420 and the direct charging circuit 430.

The power meter block 440 may detect levels of voltages and currents of various nodes in the semiconductor chip 400, and as an example of operation, may detect the levels of voltages and currents at an input terminal receiving the charging power from a charger. In addition, the fuel gauge block 450 may detect various pieces of information (for example, a capacity, the number of charging/discharging cycles, temperature, and/or the voltage/current) of the battery. Although not illustrated in FIG. 5, various types of information may be provided from the power meter block 440 and the fuel gauge block 450 to an application processor outside the CC circuit block 410 or outside the semiconductor chip 400.

According to the above-described embodiments, the CC circuit block 410 may perform communication for adjusting the level of the charging power according to the detection result of the level (for example, the voltage level and/or the current level) of the charging power from the charger. For example, the CC circuit block 410 may receive the detection result from the power meter block 440 and/or the fuel gauge block 450, or may receive the detection result from a separate circuit (for example a detection sensor) included in the semiconductor chip 400.

Figure 6:
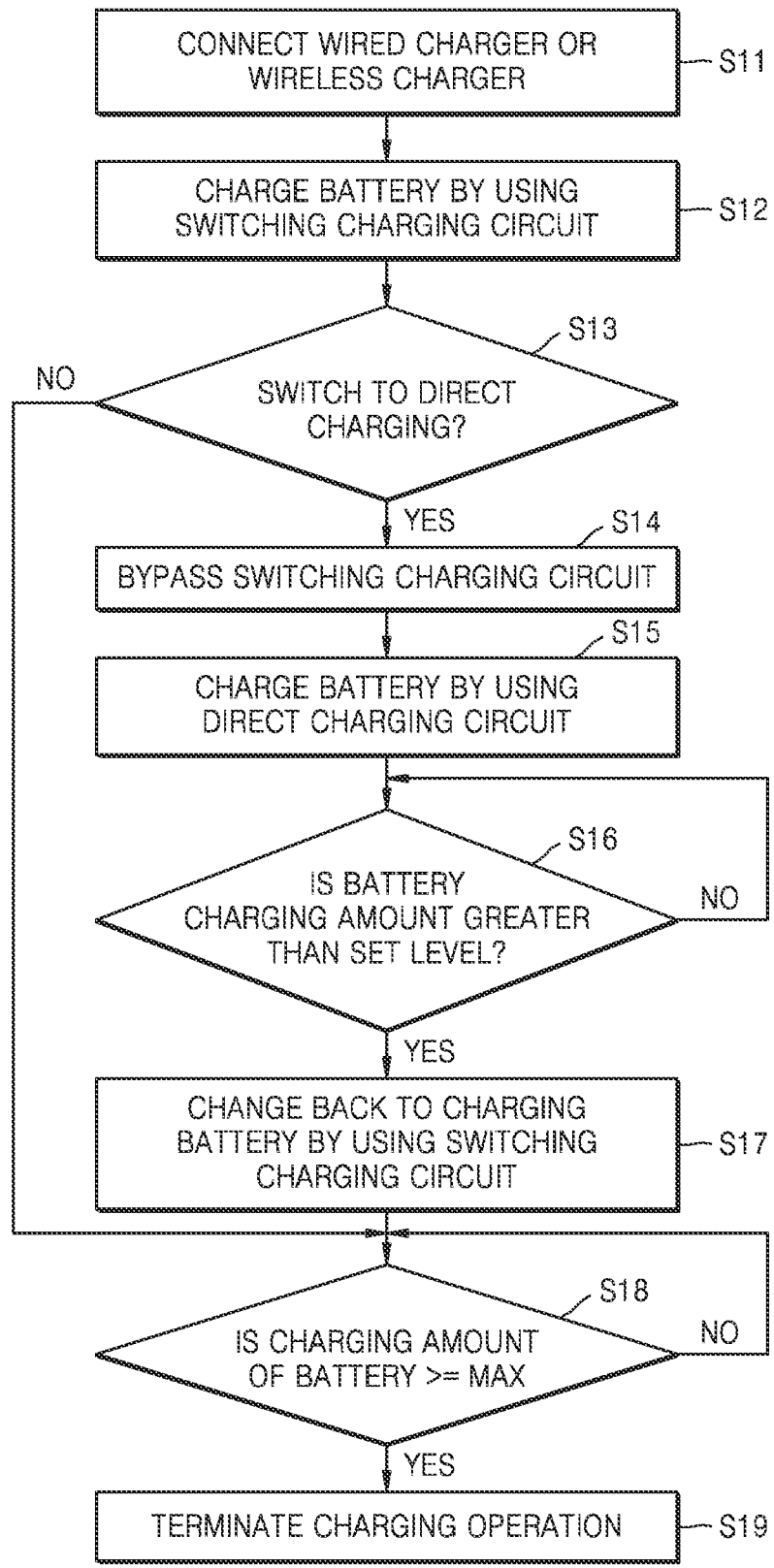
FIG. 6 is a flowchart illustrating an operation method of a charging management chip, according to an example embodiment.

FIG. 6 is a flowchart illustrating an operation method of a charging management chip, according to an example embodiment.

Referring to FIG. 6, a wired charger or a wireless charger may be connected (S11). The charging management chip may be provided in an electronic system including a battery, and may be connected to an external wired charger via a wired interface for wired charging of the electronic system, and may also be connected to an external wireless charger via a wireless interface for wireless charging. The charging management chip may charge the battery by using a charging power from a wired charger or a wireless charger. For example, since the charging management chip includes a switching charging circuit and a direct charging circuit, the charging management chip may enter various charging modes and perform a charging operation.

The battery is charged using a switching charging circuit (S12). When the wired charger or the wireless charger (hereinafter, referred to as a charger) is connected to the electronic system, a switching charging circuit of the charging management chip may operate in the charging mode, and accordingly, the battery may be charged by using the switching charging method, and a charge amount (or a battery voltage) of the battery may be increased.

It is determined whether to switch to direct charging (S13). To perform a direct charging operation according to the direct charging method, certain requirements may need to be satisfied, and accordingly, it may be determined whether the certain requirements for performing the direct charging operation is satisfied. As an example, it may be determined whether the charger connected to the electronic system corresponds to a charger supporting a direct charging function. In addition, the voltage of the battery and/or voltages of one or more nodes in the charging management chip may be determined, and whether to switch to direct charging may be determined based on the voltage of the battery and/or the voltages of the one or more nodes. For example, in the case where the direct charging operation is to be performed when the voltage of the battery is greater than or equal to a certain reference level (for example, a first reference level), it may be determined that the certain requirement is satisfied when the voltage of the battery is greater than or equal to the certain reference level.

When it is determined not to switch to direct charging (S13, NO), the process may proceed to S18. On the other hand, when it is determined to switch to direct charging (S13, YES), the direct charging circuit may operate in a direct charging mode, and the switching charging circuit may be bypassed (S14). For example, the direct charging circuit may operate in the direct charging mode, the switching charging circuit may be bypassed and charging power from the charger may be passed from the input circuit through the switching charging circuit and be provided to an input node of the direct charging circuit. The battery may be charged using the direct charging circuit (S15). For example, the charging power may be provided to the battery via a switching circuit of a direct charging circuit and an output node by using a switching operation of the switching circuit in the direct charging circuit, and accordingly, a battery charging operation using the direct charging circuit may be performed.

The charging operation according to the direct charging method may be performed when the voltage level of the battery is within a certain range. For example, as described above, when the battery voltage is equal to or greater than the certain first reference level, the charging operation according to the direct charging method may be started, and when the battery voltage is increased to reach a certain set level (for example, a second reference level), the direct charging operation may be terminated, and the charging operation according to the switching charging method may be performed again.

Accordingly, it may be determined whether an amount of charge amount of the battery is greater than the set level (S16). When the charge amount of the battery is not greater than the set level (S16, NO), the battery charging according to the direct charging method may be continuously performed. On the other hand, when the charge amount of the battery is greater than the set level (S16, YES), the charging may be changed back to charging using the switching charging circuit (S17). For example, the charging mode may be changed back to charging using the switching charging circuit to finely adjust the charge amount of the battery based on a constant voltage control scheme, and accordingly, an operation of charging the battery may be performed by using the switching charging circuit.

Thereafter, it may be determined whether the charging amount of the battery is greater than or equal to a maximum charging value Max (S19). For example, the maximum charging value Max may be a maximum charging value that is supported by charging, and when the charging amount of the battery reaches the maximum charging value Max, the charging operation may be terminated (S19). When the charging amount of the battery has not reached the maximum charging value Max (S18, NO), charging may be continuously performed.

Figure 7:
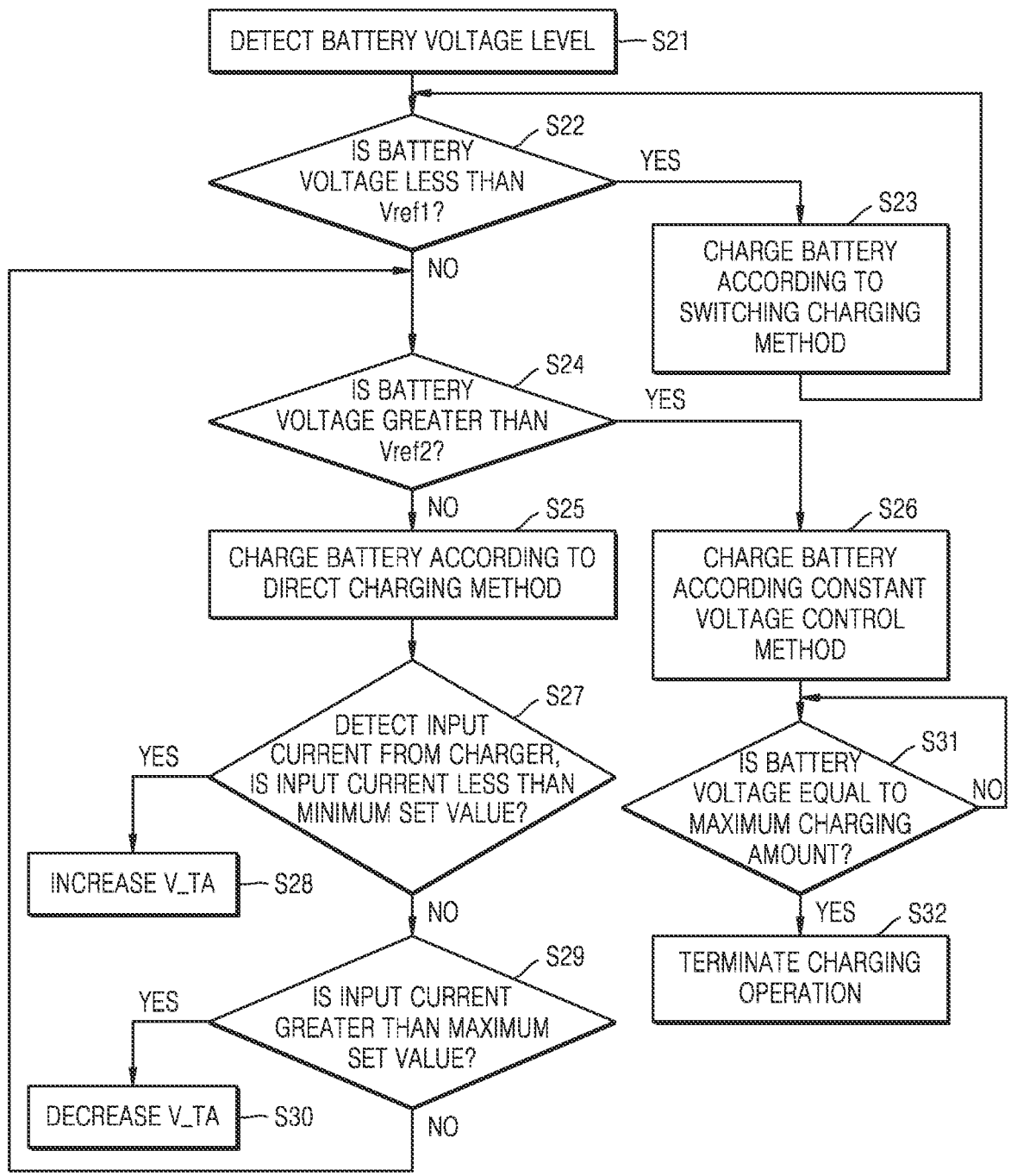
FIG. 7 is a flowchart illustrating a detailed example of a direct charging operation, according to an example embodiment.

FIG. 7 is a flowchart illustrating a detailed example of a direct charging operation, according to an example embodiment.

Referring to FIG. 7, the charger may be connected to the electronic system, and the voltage level of the battery may be detected (S21). As an example, it may be determined whether the voltage level of the battery corresponds to a level between a first reference level Vref1 and a second reference level Vref2 as levels that may be reached by the direct charging. It may be determined whether the voltage level of the battery is less than the first reference level Vref1 (S22), and when the voltage level of the battery is less than the first reference level Vref1 (S22, YES), the battery may be charged according to the switching charging method (S23), and the process may return to S22. For example, the voltage level of the battery may be increased since the battery is charged according to the switching charging method.

When the voltage level of the battery is greater than or equal to the first reference level Vref1 (S22, NO), it may be determined whether the voltage level of the battery is greater than the second reference level Vref2 (S24), and when the voltage level of the battery is greater than the second reference level Vref2 (S24, YES), the battery may be charged according to a constant voltage control method (S26). For example, the battery may be charged according to the constant voltage control method based on the switching charging method without performing the direct charging method. On the other hand, when the voltage level of the battery is less than the second reference level Vref2 (S24, NO), since the requirement for direct charging is satisfied, the battery may be charged according to the direct charging method (S25). As described above, when the voltage of the battery is greater than the second reference level Vref2 in the case where the charger is connected to the electronic system, the battery charging operation may be completed without performing the direct charging, and when the voltage of the battery corresponding to a level between the first reference level Vref1 and the second reference level Vref2, the direct charging operation may be directly performed.

An input current from the charger may be detected and it may be determined whether an input current is less than a minimum set value (S27). In the charging operation according to the direct charging method, the level of the input current from the charger (or the current applied to the battery) may be required to satisfy a certain range (for example, a range between a minimum set value and a maximum set value), and accordingly, it may be possible to detect the level of the input current from the charger and determine whether the level of the input current is less than the minimum set value. When the level of the input current is less than the minimum set value (S27, YES), the charging power V_TA may be increased (S28). For example, the charging power V_TA may be increased through communication between the charging management chip and the charger. When the input current is greater than or equal to the minimum set value (S27, NO), it may be determined whether the input current is greater than a maximum set value (S29). When the input current is greater than the maximum set value (S29, YES), the charging power V_TA may be decreased (S30). For example, the charging power V_TA may be reduced through communication between the charging management chip and the charger. On the other hand, when the input current is less than or equal to the maximum set value (S29, NO), the process returns to S24.

In the charging process according to the direct charging method, the operation of determining whether the battery voltage is greater than the second reference level Vref2 may be continuously performed, and when the battery voltage rises to exceed the second reference level Vref2 (S24, YES), the charging operation according to the constant voltage control method may be performed as described above. Thereafter, it may be determined whether the battery voltage is equal to the maximum charging amount (S31), and when the battery voltage is equal to the maximum charging amount (S31, YES), the charging operation may be terminated (S32). Otherwise, when the battery voltage is not equal to the maximum charging amount (S31, NO), charging according to the constant voltage control method may be continuously performed until the battery voltage becomes equal to the maximum charging amount. That is, the process may return to S31.

Figure 8A:
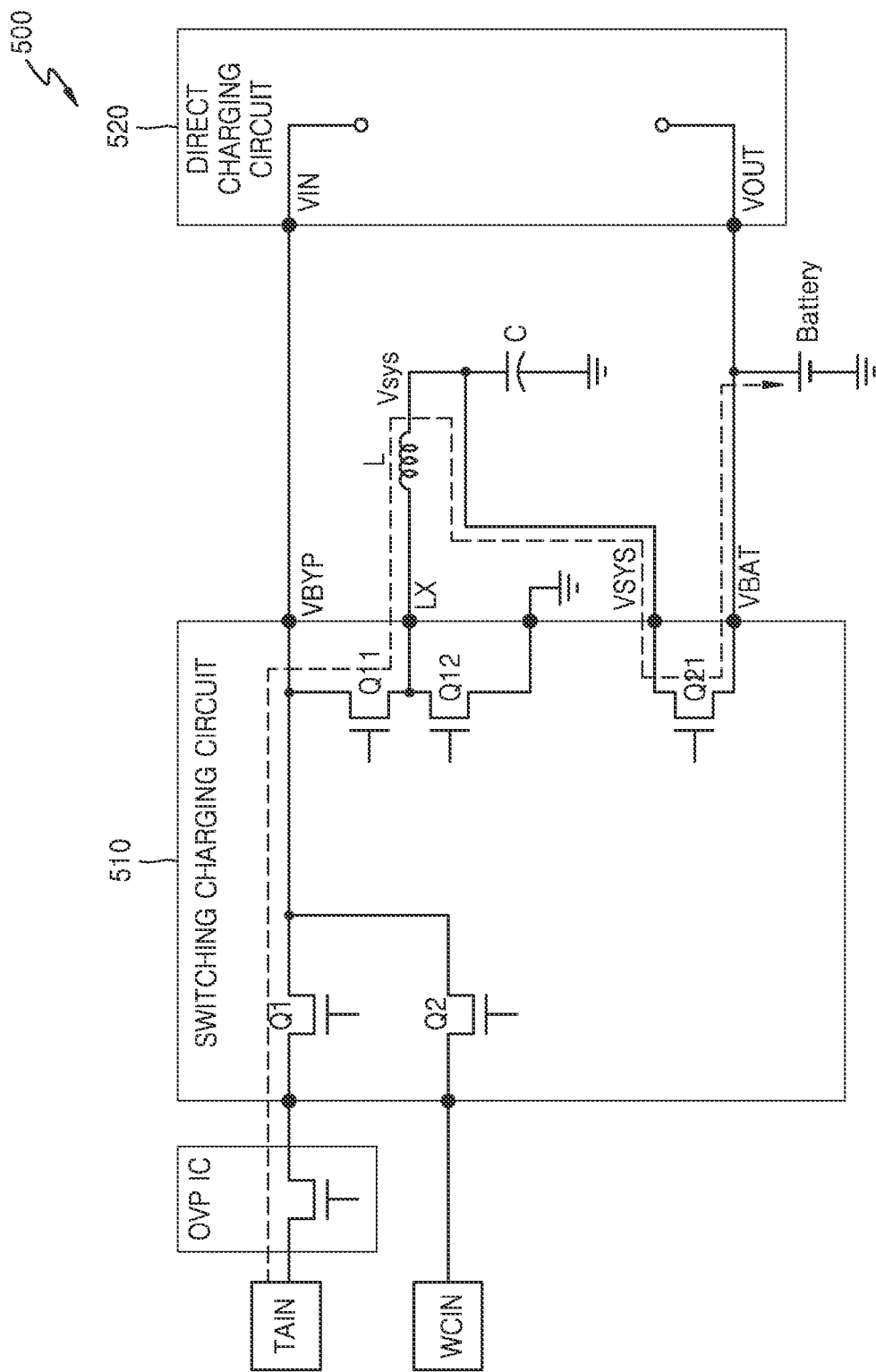
FIGS. 8A, 8B, and 8C are circuit diagrams illustrating various charging modes of a charging management chip, according to example embodiments.
Figure 8B:
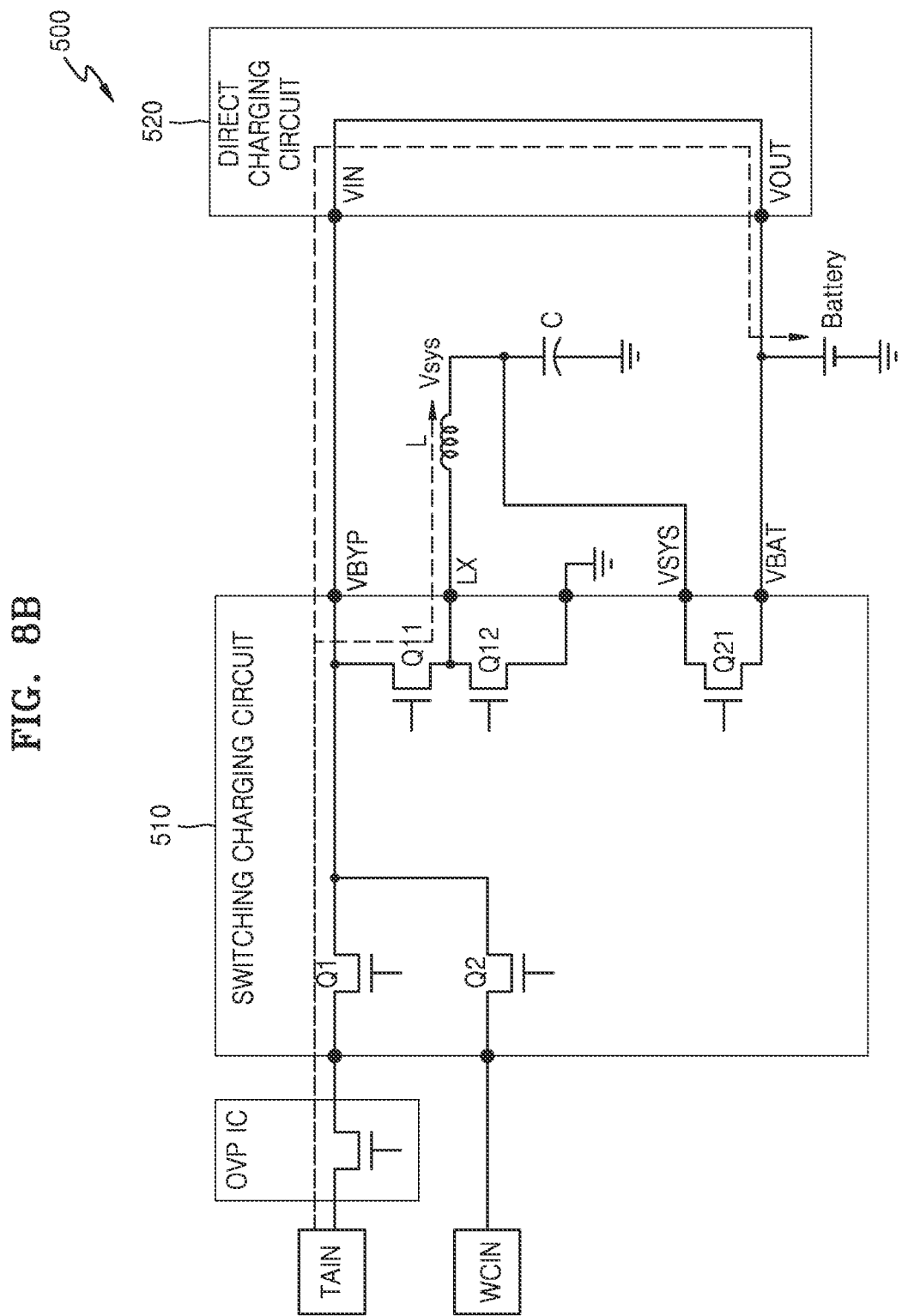
Figure 8C:
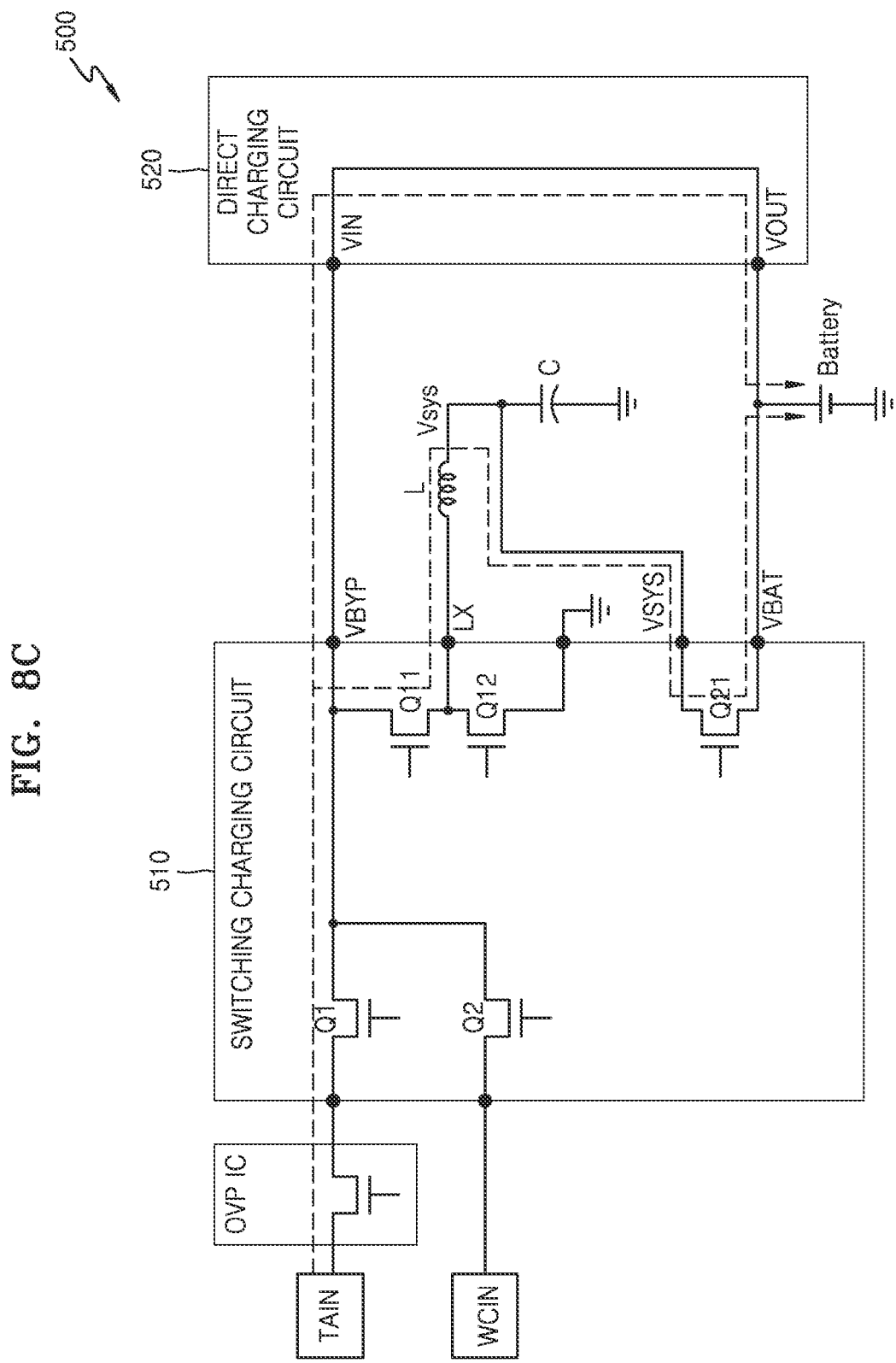

FIGS. 8A, 8B, and 8C are circuit diagrams illustrating various charging modes of a charging management chip, according to example embodiments. Configurations and operations of the various circuits illustrated in FIGS. 8A, 8B, and 8C have been described in the above embodiments, and thus detailed descriptions thereof are omitted for conciseness. In the embodiments illustrated in FIGS. 8A, 8B, and 8C, it is assumed that a charging management chip 500 receives the charging power via the wired interface as the charger corresponding to the wired charger is connected to the electronic system. However, this is only an example, and in some embodiments, the charging management chip 500 may receive the charging power via the wireless interface as the charger, or may receive the charging power via both the wired interface and the wireless interface as the charger, as discussed above.

Referring to FIG. 8A, a case where the switching charging circuit 510 operates in the charging mode, and the direct charging circuit 520 is in an off mode is illustrated. Accordingly, a first charging path (see, e.g., Path_S in FIG. 3) via the switching charging circuit 510 may be activated while a second charging path (see, e.g., Path_D in FIG. 3) via the direct charging circuit 520 may be deactivated. Charging power from the charger may be provided to the switching charging circuit 510 via the OVP IC, and the charging power may be provided to a buck control circuit via the first input switch Q1. In addition, the battery may be charged through a first charging path including the buck control circuit, the inductor L, and the path control switch Q21.

FIG. 8B illustrates an example in which the direct charging circuit 520 operates in the charging mode and the switching charging circuit 510 operates in the buck mode. Accordingly, the first charging path via the switching charging circuit 510 may be deactivated while a second charging path via the direct charging circuit 520 may be activated. As an example, since the charging power provided to the switching charging circuit 510 is provided to the direct charging circuit 520 via the first node VBYP, and a switching circuit (not illustrated) in the direct charging circuit 520 is turned on, the battery may be charged through a second charging path including the input node VIN, the switching circuit (not illustrated) in the direct charging circuit 520, and the output node VOUT.

In the embodiment illustrated in FIG. 8B, since the switching charging circuit 510 operates in the buck mode, some of the power from the charger may be provided via the first buck switch Q11 and the inductor L as the system voltage Vsys. In addition, as the path control switch Q21 is turned off, the first charging path through the switching charging circuit 510 may be deactivated.

FIG. 8C illustrates an example in which both the switching charging circuit 510 and the direct charging circuit 520 operate in the charging mode, and accordingly, the first charging path (see, e.g., Path_S in FIG. 3) via the switching charging circuit 510 and the second charging path (see, e.g., Path_D in FIG. 3) via the direct charging circuit 520 may be activated together. As an example, the battery may be charged through the buck control circuit and the power path control circuit through the first charging path including the path control switch Q21, and the battery may be charged through the second charging path including the input node VIN, a switching circuit (not illustrated) in the direct charging circuit 520, and the output node VOUT in the direct charging circuit 520. That is, in other words, both Path_S and Path_D in FIG. 3 may be used together in the example illustrated in FIG. 8C.

Figure 9:
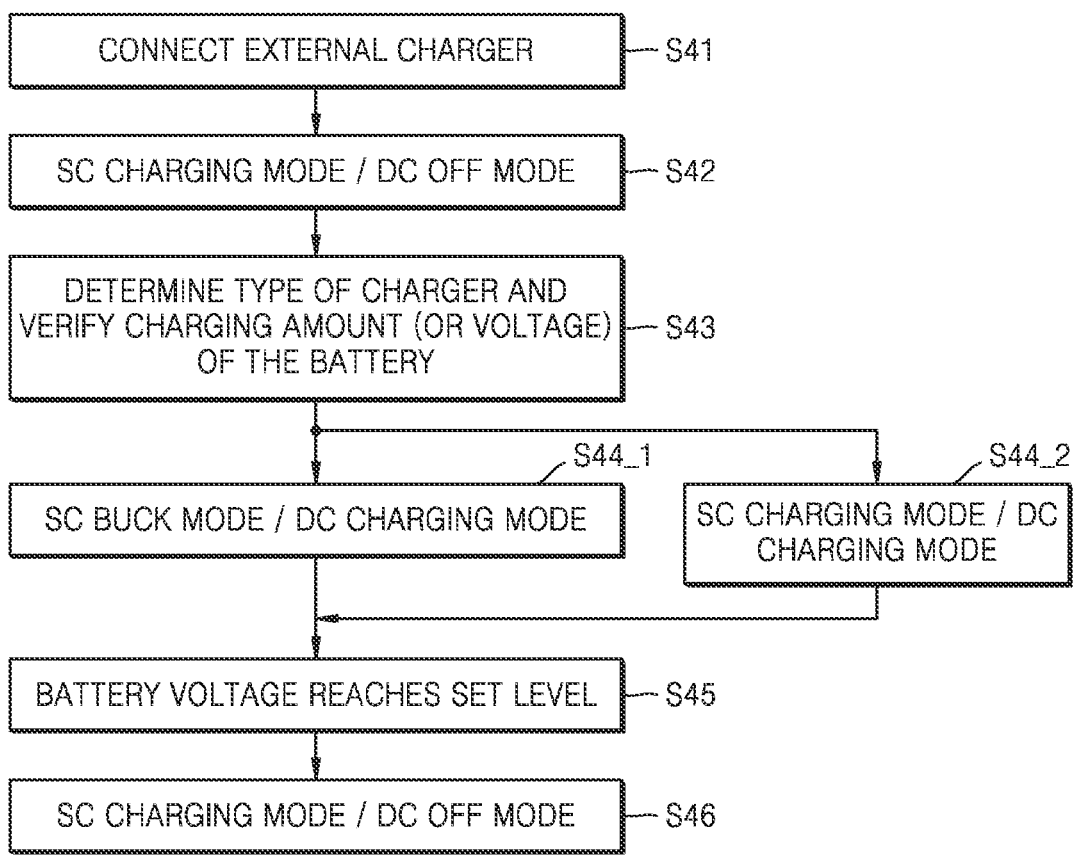
FIG. 9 is a flowchart illustrating an example of a charging operation using the various charging modes illustrated in FIGS. 8A, 8B, and 8C, according to an example embodiment.

FIG. 9 is a flowchart illustrating an example of a charging operation using various charging modes illustrated in FIGS. 8A, 8B, and 8C, according to an example embodiment.

Referring to FIGS. 8A, 8B, 8C, and 9, an external charger is connected (S41). For example, the external charger may be connect to an electronic system. The charging management chip may charge the battery in the switching charging (SC) mode with the direct charging (DC) off mode (S42). For example, the charging management chip may charge the battery in the switching charging mode with the switching charging method as described above with reference to FIG. 8A until the type of the connected charger is recognized. Accordingly, the switching charging circuit may operate in the switching charging (SC) mode, and the direct charging circuit may maintain a direct charging (DC) off mode.

The type of the charger may be determined and the charging amount (or the voltage) of the battery may be verified (S43). For example, to determine whether to charge the battery according to the direct charging method, the type of the charger may be determined and the charging amount (or the voltage) of the battery may be verified. As an example, it may be determined whether the connected charger supports only the normal charging, or whether the connected charger supports the fast charging together with the normal charging, and supports the direct charging according to the above embodiments, and in addition, when the voltage of the battery exceeds a certain reference level, the battery may be charged according to the direct charging method.

Based on the type of charger and the charging amount (or voltage) of the battery, the switching charging circuit may operate in the switching charging (SC) buck mode and the direct charging circuit may operate in the direct charging (DC) charging mode (S44_1), or the switching charging circuit may operate in the switching charging (SC) mode and the direct charging circuit may operate in the direct charging (DC) charging mode (S44_2). That is, the direct charging circuit may enter the direct charging mode. In addition, in the charging mode of the direct charging circuit, the switching charging circuit may operate in various modes. As an operation example, when the power of the electronic system is on, the system voltage may need to be provided to various components inside the electronic system, and in this case, when the switching charging circuit operates in the buck mode, the system voltage may be provided. When the power of the electronic system is off, the switching charging circuit may operate in the charging mode.

Thereafter, as the battery is charged according to the direct charging method, the battery voltage may be increased, and the battery voltage may reach a set level (S45). When the battery voltage reaches the set level, the switching charging circuit may operate in the switching circuit (SC) charging mode to finely adjust the charging amount of the battery, and the direct charging circuit may be changed to the direct charging (DC) off mode (S46), and thus the switching charging circuit may finely control the charge amount of the battery in the constant voltage charging method.

Figure 10:
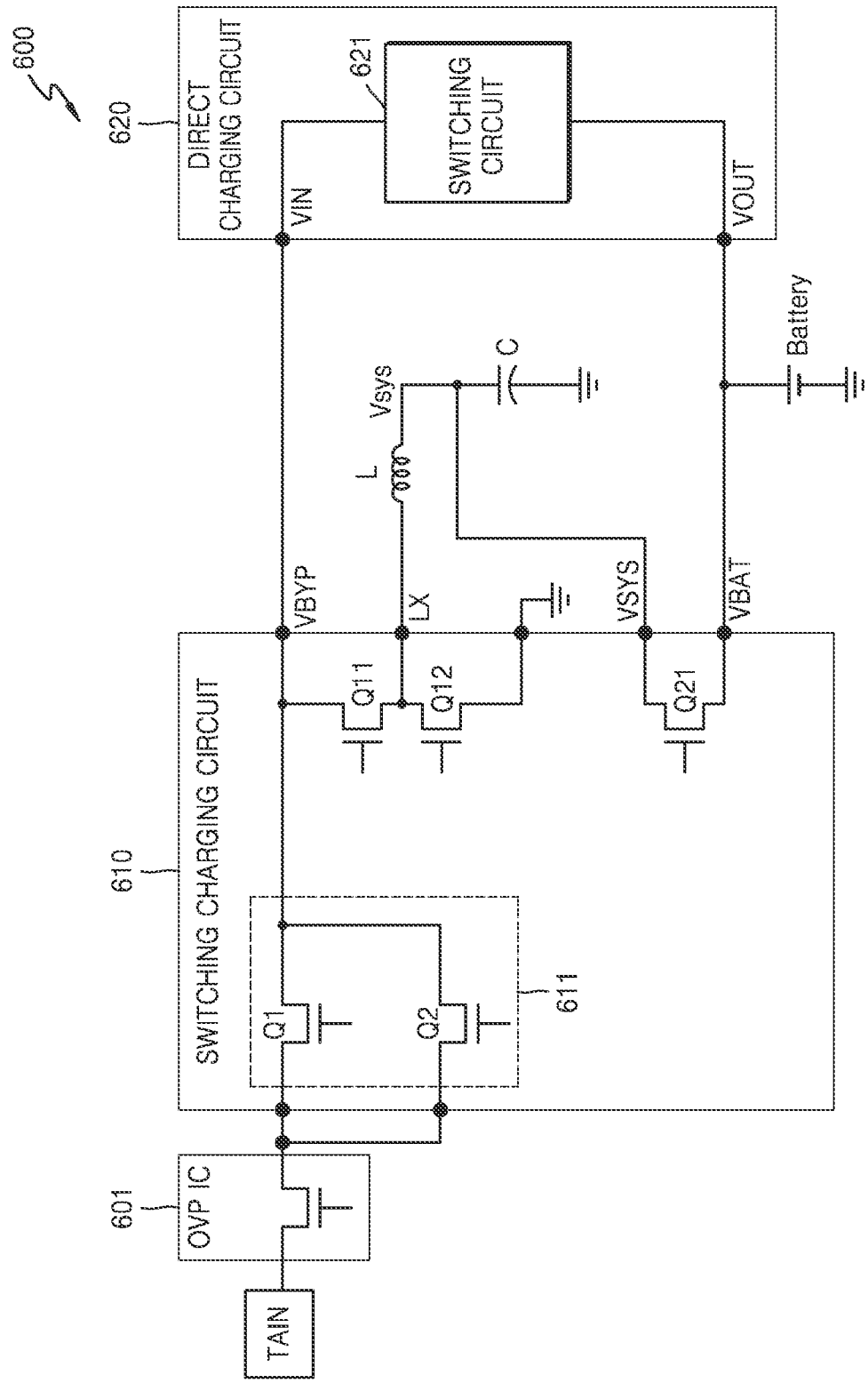
FIG. 10 illustrates an implementation example of a charging management chip, according to various example embodiments.

FIG. 10 illustrates an implementation example of a charging management chip according to various example embodiments.

The electronic system employing the charging management chip may support charging by using various methods such as the wired charging and the wireless charging. However, some electronic systems may support only the wired charging. In this case, the charging management chip 600 in the electronic system supporting only the wired charging may omit a wireless interface, and accordingly, the configuration of an input switch circuit 611 of a switching charging circuit 610 of the charging management chip 600 may be modified with respect to the above-described embodiments.

As an example, the charging management chip 600 may operate according to various charging modes by including the switching charging circuit 610 and the direct charging circuit 620, and the charging power from an external wired charger may be provided to the input switch circuit 611 of the switching charging circuit 610 via an OVP IC 601.

The input switching circuit 611 may include the first input switch Q1 and the second input switch Q2, and one node of the first input switch Q1 may be connected to a first input terminal of the input switching circuit 611, and one node of the second input switch Q2 may be connected to a second input terminal of the input switching circuit 611. In addition, when the charging management chip 600 is employed in an electronic system that does not support the wireless charging function, the second input terminal may not be connected to the wireless interface.

In this case, the first input terminal and the second input terminal may be electrically shorted to each other, and accordingly, when the first input switch Q1 and the second input switch Q2 are connected in parallel and turned on, an equivalent resistance value of the first and second switches Q1 and Q2 may be reduced, and the charging efficiency may be improved. In an embodiment, the OVP IC 601 may provide the charging power from the wired charger via the charging power output node, and the first input terminal of the input switch circuit 611 may be electrically connected to the charging power output node. In addition, the second input terminal of the input switching circuit 611 may be connected to a wiring formed outside the charging management chip 600, and since the wiring connected to the second input terminal is connected to the aforementioned charging power output node, the first input terminal and the second input terminal may be electrically shorted.

According to the above-described example embodiments, when the charging management chip according to the example embodiments is employed in an electronic system that supports the wired charging and wireless charging functions, even though the wired charger and the wireless charger are simultaneously connected to the electronic system, the charging power from one charger may be selected by using a selective switching operation of the first input switch Q1 and the second input switch Q2, and accordingly, a short between a plurality of chargers may be prevented. When the electronic system supports only the wired charging according to the example embodiment illustrated in FIG. 10, the charging efficiency may be improved by electrically shorting the first input terminal and the second input terminal of the input switching circuit 611.

In the example embodiment illustrated in FIG. 10, a case in which the first input terminal and the second input terminal are shorted via wirings formed outside the charging management chip 600 is described. However, embodiments are not limited thereto. In some embodiments, a connection control switch (not illustrated) connected between the first input terminal and the second input terminal may be provided in the charging management chip 600, and whether the wireless charging of the electronic system employing the charging management chip 600 may be verified, and by turning on the connection control switch (not illustrated) according to the verification result, the first input terminal and the second input terminal may be electrically connected.

In addition, according to some example embodiments, it may be determined whether the charging power is provided to the charging management chip 600 via the wireless interface, and according to the determination result, the turn-on/turn-off of the connection control switch (not illustrated) may be controlled. As an example, when the connection control switch (not illustrated) is further included in the charging management chip, and the charging power via the wireless charger is not provided (or the wireless charger is not connected), by turning on the connection control switch (not illustrated), the first input terminal and the second input terminal may be electrically connected.

Figure 11A:
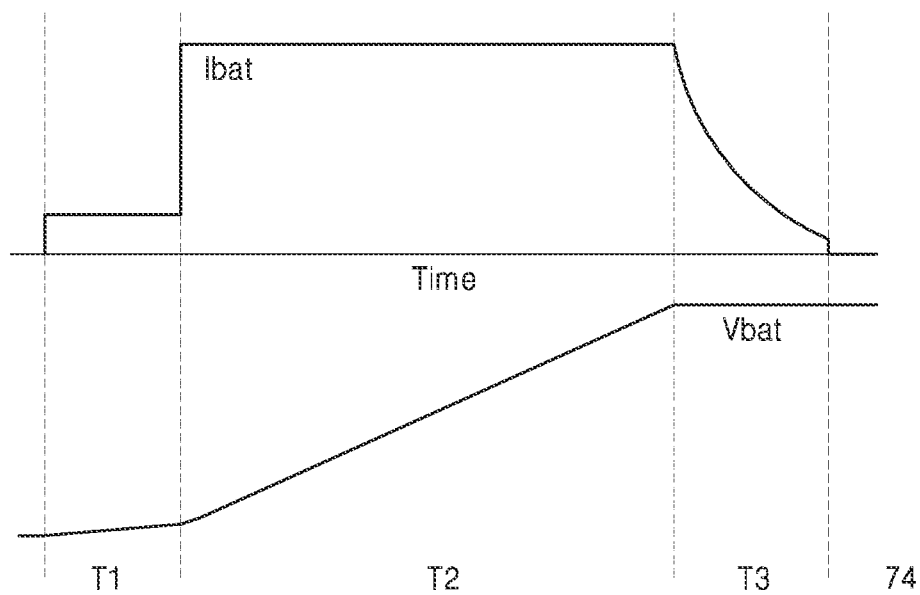
FIGS. 11A and 11B are graphs illustrating examples of a charging profile according to a related art switching charging method and a charging profile according to a charging method according to an example embodiment, respectively.
Figure 11B:
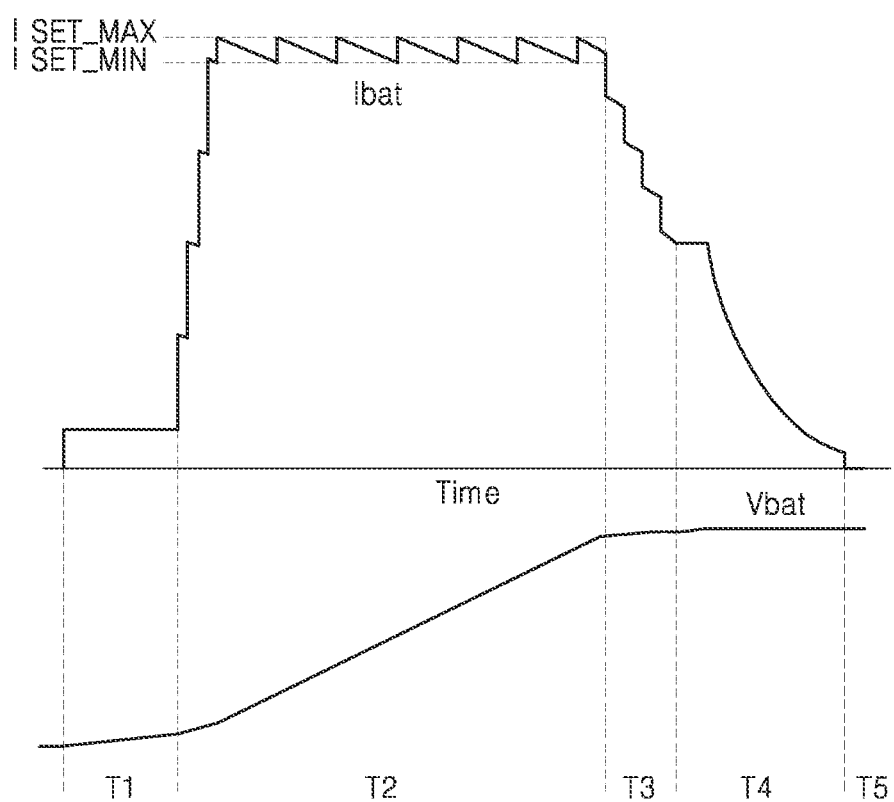

FIGS. 11A and 11B are graphs illustrating examples of a charging profile according to a related at switching charging method and a charging profile according to a switching charging method and a charging profile an example embodiment, respectively. In the graphs of FIGS. 11A and 11B, a horizontal axis may represent time, and a vertical axis may represent a charge current Ibat and a battery voltage Vbat. In addition, the charging current Ibat illustrated in FIGS. 11A and 11B may correspond to a current provided to the battery, or may correspond to a current of the charging power provided from a charger. For example, the current level Ibat of the charging power provided from the charger may be defined as a sum of a current actually provided to the battery and a current (for example, a load current) provided to the node VSYS connected to the system voltage Vsys. In the following embodiment, it is assumed that the charging current Ibat of FIGS. 11A and 11B corresponds to the current of the charging power supplied from the charger.

Referring to FIG. 11A, since the charger connected to the electronic system does not support the direct charging function, the battery may be charged by the switching charging method. For example, since various levels of charging current or charging voltage are provided to the battery in the switching charging method, the switching charging operation may include a plurality of periods, and as an example in FIG. 11A, first through fourth periods T1 through T4 are illustrated.

In the first period T1, the battery may be in a state of being over-discharged such that the voltage VBat is below a certain level (for example, below about 3.1 V), and since the battery stability may be deteriorated when a high current is provided to the battery in the state of being over-discharged, the battery may be charged based on the charging current Ibat having a relatively low level, and accordingly, the battery voltage Vbat may be slowly increased during the first period T1.

The second period T2 may correspond to a constant current section, and since the battery is charged by using the charging current Ibat having a level higher than that of the first period T1, the battery voltage Vbat may be rapidly increased. As an operation example, the level of the charging current Ibat may be maintained constant in the second period T2. In an example embodiment, the second period T2 may correspond to a quick charging period when the charger supports quick charging. When the battery voltage Vbat rises to a certain set level, the switching charging operation may enter the third period T3.

The third period T3 may correspond to the constant voltage period, and in the third period T3, the battery voltage Vbat may be maintained constant and the level of the charging current Ibat may be reduced. When the level of the charging current Ibat is reduced to a certain set level, the supply of the current to the battery may be stopped. When the supply of the current to the battery is stopped, the battery may be discharged. When the battery voltage Vbat is lowered to the set level, the switching charging operation may enter the fourth period T4. To increase the battery voltage Vbat in the fourth period T4, the charging current Ibat may be temporarily provided to the battery.

FIG. 11B illustrates examples of charging profiles when the direct charging method is applied according to example embodiments. In FIG. 11B, a charger connected to an electronic system supports the direct charging function, and accordingly, the electronic system may communicate with the charger via various terminals (for example, a CC pin in the USB Type C structure) to provide level adjustment information to the charger, and the charger may adjust and output the level of the charging power according to the level adjustment information from the electronic system. According to an example embodiment, the charging profile in FIG. 11B may include first to fifth periods T1 through T5.

First, a charger supporting the direct charging function may be connected to the electronic system, and may charge the battery by the switching charging operation by using a relatively low level of the charging current Ibat in the first period T1, and accordingly, the battery voltage Vbat may increase slowly during the first period T1. In addition, it may be determined whether the charger connected to the electronic system supports the direct charging function during the first period T1, and when the level of the battery voltage Vbat rises to a level at which the direct charging is possible, a battery charging mode may be changed from the switching charging mode to the direct charging mode at a second time period T2.

According to an example embodiment, a minimum set value ISET_MIN and a maximum set value ISET_MAX may be defined such that the level of the charging current Ibat is maintained within a certain range in the second period T2. According to an example embodiment, the level of the charging current Ibat may be compared with the minimum setting value ISET_MIN and maximum setting value ISET_MAX, and according to the comparison result, the level of the charging power (or charging current) may be adjusted.

Until the level of the charging current Ibat becomes greater than the minimum set value ISET_MIN in the second period T2, the electronic system may provide the level adjustment information for increasing the level of the charging power to an external charger, and the external charger may increase the level of the charging power and provide the resultant charging power to the electronic system. Accordingly, the level adjustment information may be provided to the external charger to increase the level of the charging power by step by step until the level of the charging current Ibat becomes greater than the minimum set value ISET_MIN, and the level of the charging current Ibat reaches the maximum set value ISET_MAX. It is noted that four steps are illustrated in FIG. 11B to reach the minimum set value ISET_MIN. However, this is only an example, and in an implementation, the number of steps may be greater or fewer than four. In addition, when the level of the charging current Ibat reaches the maximum setting value ISET_MAX, the level adjustment information may be provided to the external charger for lowering the level of the charging current Ibat by one step. In this way, the level of the charging current Ibat may be maintained between the minimum set value ISET_MIN and the maximum set value ISET_MAX during the second period T2.

The third period T3 may also correspond to the charging operation based on the direct charging method, and the charging operation may be controlled according to a method similar to the constant voltage (CV) control method. As an example, the level of the charging current Ibat may be lowered step by step based on the communication between the electronic system and the external charger, and the battery voltage Vbat may increase finely or maintain a constant level during the third period T3. Thereafter, when the level of the charging current Ibat drops to a certain set value (or when the battery voltage Vbat reaches a certain set level), the switching charging operation may be changed from the direct charging mode to the switching charging mode, and accordingly, the charging operation may enter the fourth period T4.

The fourth period T4 may correspond to the CV period of the switching charging operation, and accordingly, the level of the charging current Ibat may be reduced, and the battery voltage Vbat may be maintained constant. When the fourth period T4 ends and the fifth period T5 starts, the charging operation may end in the fifth period T5. In addition, the supply of the charging current is stopped in the fifth period T5, and the battery may be discharged, and in some example embodiments the charging current Ibat may be temporarily provided to the battery for raising the battery voltage Vbat in the fifth period T5.

In the example embodiment illustrated with reference to FIG. 11B, the switching charging operation is described as being terminated in the direct charging operation, but the example embodiments are not limited thereto. For example, the switching charging operation and the direct charging operation may be performed together, and accordingly, the switching charging operation may be performed together with the direct charging operation in the second period T2 and the third period T3.

FIGS. 12A, 12B, 13A, and 13B are circuit diagrams illustrating example implementations of a switching circuit and switching operations provided in the direct charging circuit. The switching circuits according to the example embodiments are not limited to the configurations of the circuit diagrams illustrated in FIGS. 12A, 12B, 13A, and 13B, and modification in various types may be possible as long as the same or similar functions as the functions according to the example embodiments may be performed.

Figure 12A:
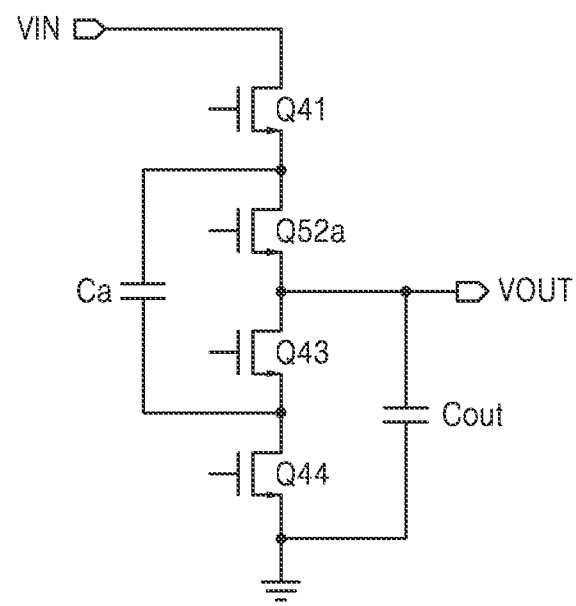
FIGS. 12A, 12B, 13A, and 13B are circuit diagrams illustrating example implementations of a switching circuit provided in a direct charging circuit, according to various example embodiments.
Figure 12B:
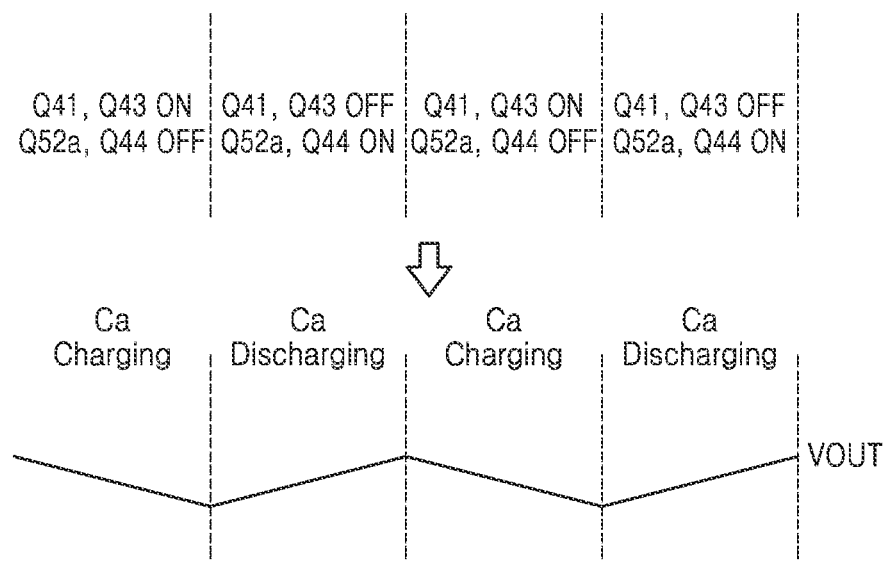

Referring to FIGS. 12A and 12B, the switching circuit of the direct charging circuit may include a plurality of switches, and a first switch Q41, a second switch Q42, a third switch Q43 and a fourth switch Q44 are illustrated as examples. The first through fourth switches Q41 through Q44 may be connected in series between the input node VIN and the ground voltage, and a node between the second switch Q42 and the third switch Q43 may be the output node VOUT. In addition, the direct charging circuit may be connected to one or more capacitors (Ca and Cout), and as an example, the capacitors (Ca and Cout) may be passive devices arranged outside the charging management chip. The first capacitor Ca may be connected between one node of the first switch Q41 and one node of the fourth switch Q44, and the output capacitor Cout may be connected to the output node VOUT. Accordingly, the direct charging circuit may operate as a voltage divider (or a capacitor divider).

Referring to FIG. 12B, the switching operation of the first through fourth switches Q41 through Q44 may be controlled in the charging operation according to the direct charging method. For example, while the first switch Q41 and the third switch Q43 are turned on, the second switch Q42 and the fourth switch Q44 may be turned off, and during the corresponding period, the first capacitor Ca may be charged. In addition, while the first switch Q41 and the third switch Q43 are turned off, the second switch Q42 and the fourth switch Q44 may be turned on, and during the corresponding period, the first capacitor Ca may be discharged. The above periods may be repeatedly performed, and the voltage level of the output node VOUT corresponding to the voltage charged in the output capacitor Cout may repeat rising and falling within a certain range, and the voltage output via the output node VOUT may be provided to the battery.

Figure 13A:
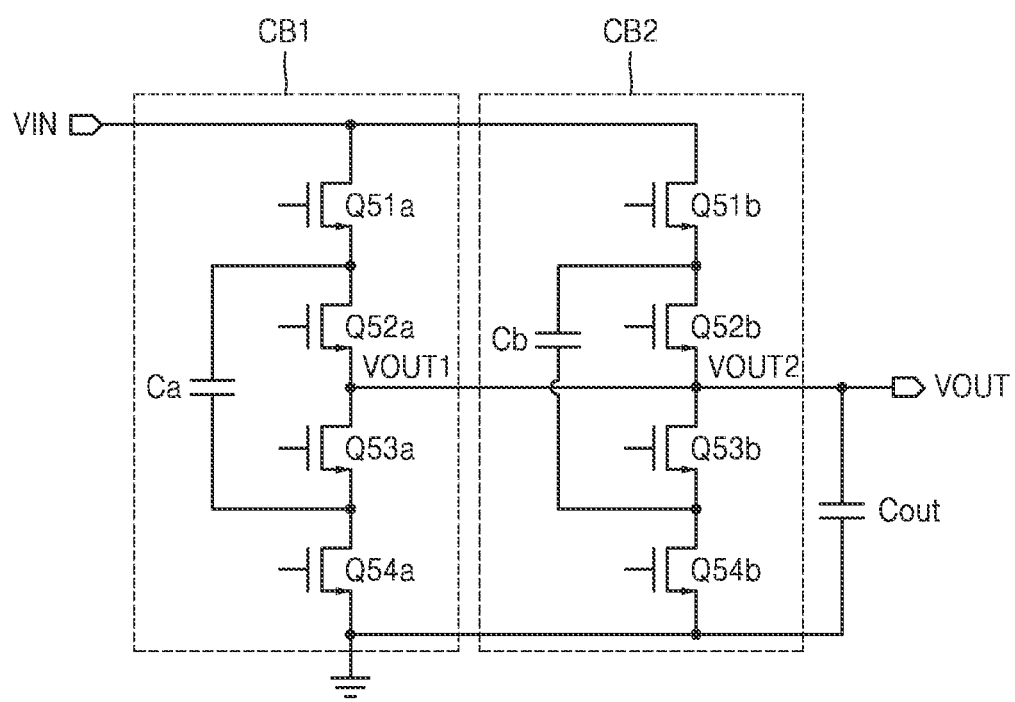
Figure 13B:
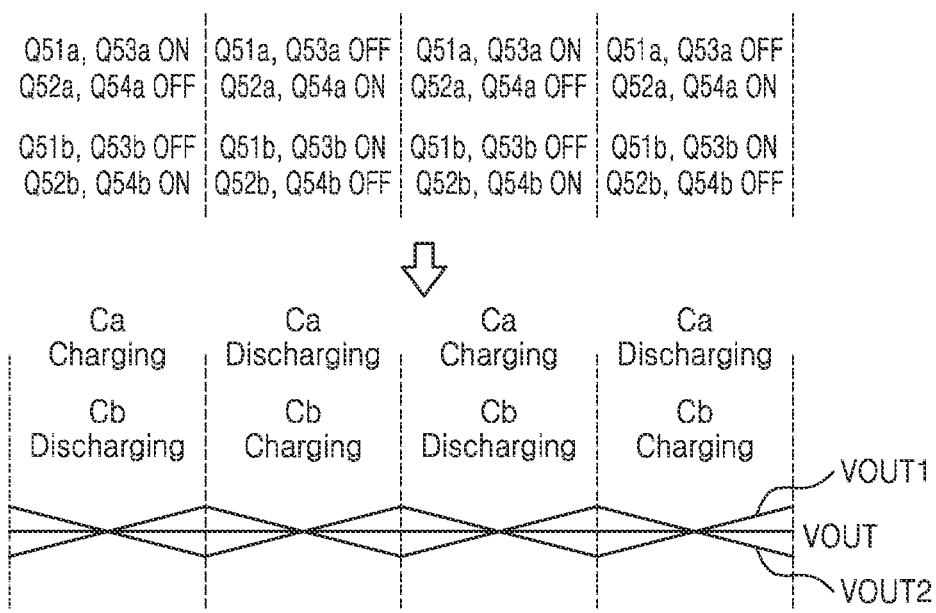

Referring to FIGS. 13A and 13B, the switching circuit of the direct charging circuit may include a plurality of switches, and for example, a first switch Q51a, a second switch Q52a, a third switch Q53a, and a fourth switch Q54a may be provided in a first capacitor block CB1, and a fifth switch Q51b, a sixth switch Q52b, a seventh switch Q53b, and an eighth switch Q54b may be provided in a second capacitor block CB2. In addition, a node between the second switch Q52a and the third switch Q53a may be connected to a first output node VOUT1 of the first capacitor block CB1, and a node between the sixth switch Q52b and the seventh switch Q53b may be connected to a second output node VOUT2 of the second capacitor block CB2. In addition, a first capacitor Ca may be connected between one node of the first switch Q51a and one node of the fourth switch Q54a, and a second capacitor Cb may be connected between one node of the fifth switch Q51b and one node of the eighth switch Q54b. The first capacitor Ca and the second capacitor Cb may be connected to an output capacitor Cout. In addition, the first capacitor Ca, the second capacitor Cb, and the output capacitor Cout may be passive components arranged outside the charging management chip.

Referring to FIG. 13B, in the charging operation according to the direct charging method, a switching operation of the first through eighth switches (Q51a through Q54a and Q51b through Q54b) in the first capacitor block CB1 and the second capacitor block CB2 may be controlled. For example, the second capacitor Cb may be discharged while the first capacitor Ca is charged, and the second capacitor Cb is charged while the first capacitor Ca is discharged. Accordingly, a voltage of the second output node VOUT2 may decrease while a voltage of the first output node VOUT1 increases, and in addition, the voltage of the second output node VOUT2 may increase while the voltage of the first output node VOUT1 decreases, and thus, the voltage of the output node VOUT provided to the battery may maintain a substantially constant level.

Figure 14:
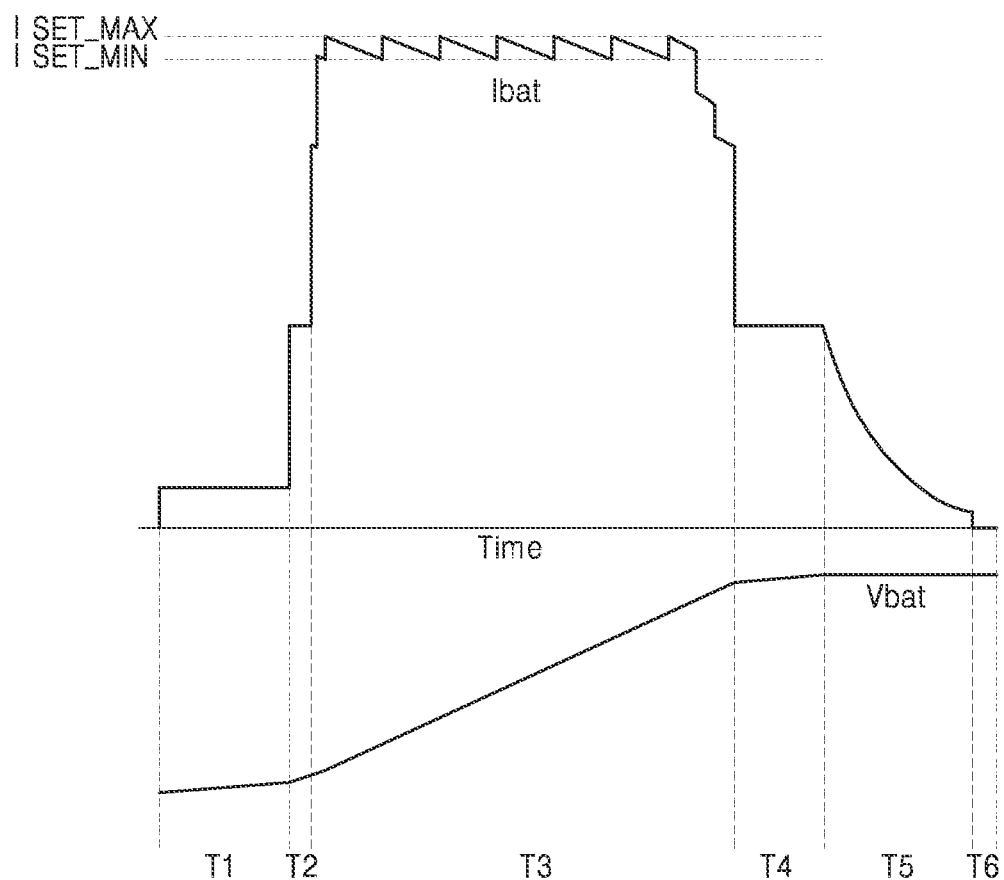
FIG. 14 is a graph illustrating another example of a charging profile of a charging management chip, according to an example embodiment.

FIG. 14 is a graph illustrating another example of a charging profile of a charging management chip, according to an example embodiment. In FIG. 14, a case is illustrated in which the fast charging is applied in a charging process for a battery, and in addition, performed together with the switching charging method and the direct charging method.

Referring to FIG. 14, in the first period T1, the battery may be charged by using the charging current Ibat of a relatively low level based on the normal charging operation of the switching charging method, and the battery voltage Vbat may be slowly increased. In the second period T2, the battery may be charged by using the charging current Ibat of a relatively high level based on the fast charging operation of the switching charging method, and accordingly, a rate of increase of the battery voltage Vbat may be increased.

Once the requirement for direct charging of the battery is satisfied, in the third period T3, the charging according to the switching charging method (for example, the quick charging method) and the direct charging method may be performed together, and accordingly, the level of the battery voltage Vbat may be increased much faster. In the third period T3, the level of the charging power may be adjusted based on communication with an external charger, and for example, the level adjustment information may be provided to the external charger such that the level of the charging current Ibat has a level between the minimum set value ISET_MIN and the maximum set value ISET_MAX similar to in the example embodiment illustrated with respect to FIG. 11B. Thereafter, the direct charging operation may be terminated. In the fourth period T4, the charging operation for the battery may be performed based on the fast charging operation of the switching charging method; in the fifth period T5, since the battery is charged according to the CV control method, the charging current may be decreased, and accordingly, the battery voltage Vbat may be maintained constant; and the charging operation may be terminated in the sixth period T6.

Figure 15:
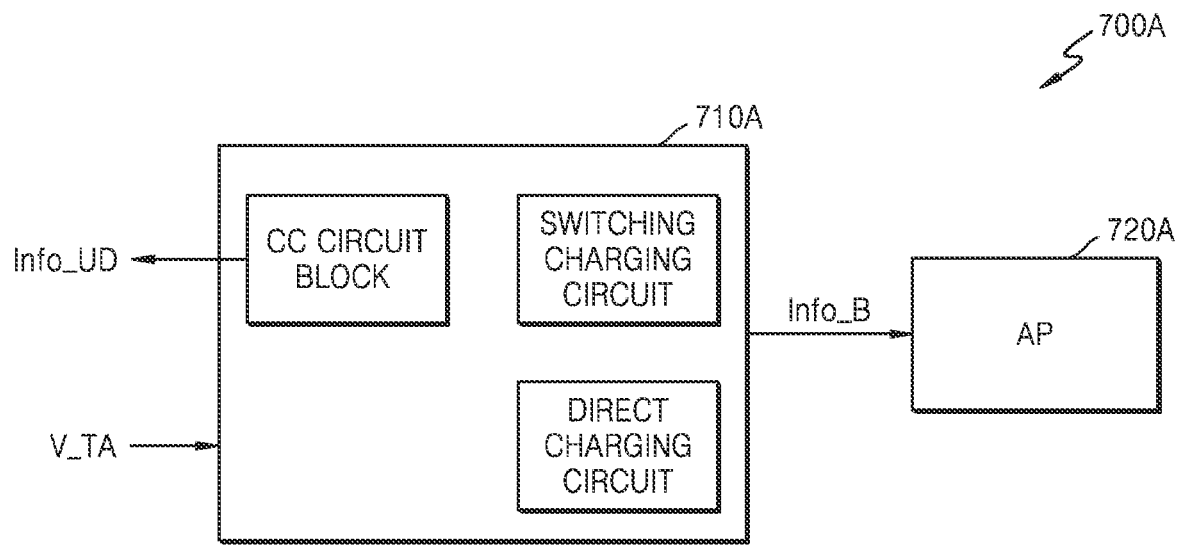
FIGS. 15 and 16 are block diagrams illustrating implementation examples of electronic systems including charging management chips, according to example embodiments.
Figure 16:
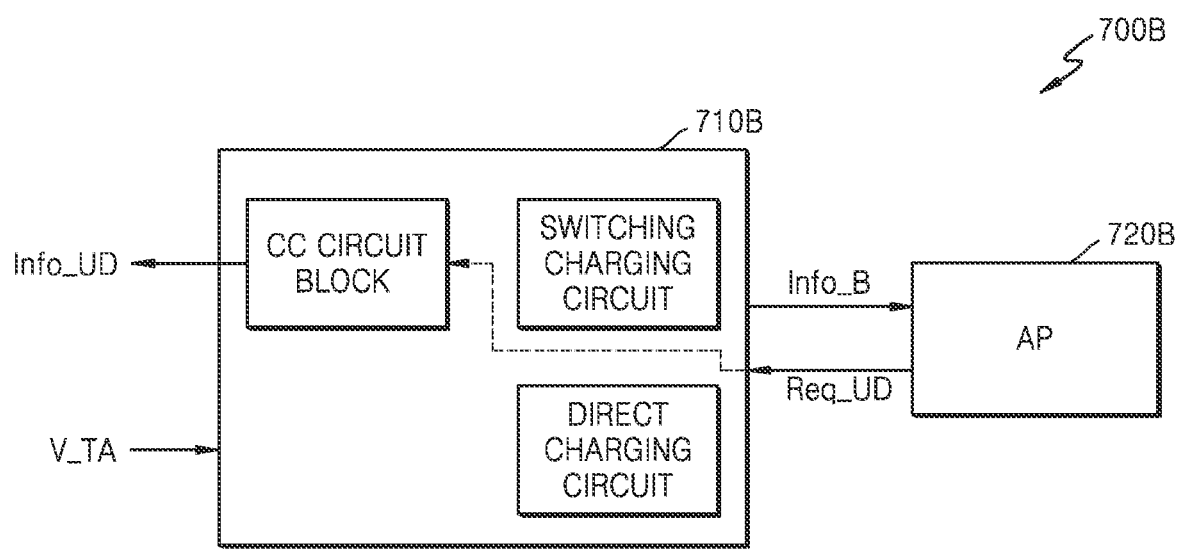

FIGS. 15 and 16 are block diagrams illustrating implementation examples of electronic systems 700A and 700B including charging management chips, according to example embodiments, respectively. FIGS. 15 and 16 illustrate communication examples according to various methods between electronic systems and external chargers.

Referring to FIG. 15, the electronic system 700A may include a charging management chip 710A and an application processor (AP) 720A, and the charging management chip 710A may include a CC circuit block, a switching charging circuit, and a direct charging circuit. The charging management chip 710A and the AP 720A may transmit and receive various types of information. For example, the charging management chip 710A may provide to the AP 720A various pieces of information Info_B including the battery charge state or the level of the charging power provided from the charger. The AP 720A may determine the battery state based on the various pieces of information Info_B, and accordingly, may perform functions such as a controlling operation of a display.

The charging management chip 710A and the AP 720A may be implemented as separate chips, and since the CC circuit block is provided in the charging management chip 710A, the charging management chip 710A may communicate with the external charger through a connector. According to an example embodiment, the charging management chip 710A may communicate with the external charger regardless of the control from the AP 720A, and in the process of charging the battery according to the charging profile according to the above-described example embodiments, the charging management chip 710A may provide the level adjustment information Info_UD to the external charger, and receive from the external charger the charging power V_TA in which the level thereof has been adjusted.

Referring to the electronic system 700B of FIG. 16, the electronic system 700B may include a charging management chip 710B and an application processor (AP) 720B, and the charging management chip 710B may include a CC circuit block, a switching charging circuit, and a direct charging circuit, similar to the electronic system 700A of FIG. 15. However, in the electronic system 700B of FIG. 16, provision of the level adjustment information Info_UD to the external charger may be controlled by the AP 720B, and the AP 720B may receive the various pieces of information Info_B from the charging management chip 710B, and based on the received various pieces of information Info_B, may provide to the charging management chip 710B a request Req_UD for adjusting the level of the charging power source V_TA. According to example embodiments, the AP 720B may determine whether the level of the charging power from the charger has been adjusted based on the various pieces of information Info_B, and may provide to the charging management chip 710B the request Req_UD according to the determination result. The charging management chip 710B may provide to the external charger the level adjustment information Info_UD based on the request Req_UD from the AP 720B.

While the inventive concept has been particularly shown and described with reference to various example embodiments thereof, it will be understood that various changes in form and details may be made therein without departing from the spirit and scope of the following claims.

What is claimed is:

1. A charging management chip comprising:
  a switching charging circuit configured to receive power from an external charger and to provide charging power according to a switching charging method;
  a direct charging circuit configured to receive the power via an input node and to provide the charging power via an output node according to a direct charging method, the charging power being transferred through a charging path not comprising a passive component in the direct charging method; and
  an input switching circuit configured to receive the power in common in the switching charging method and the direct charging method and to provide the power to at least one circuit block in the switching charging circuit and the input node of the direct charging circuit,
  wherein the switching charging circuit and the direct charging circuit are formed on a same semiconductor substrate.

2. The charging management chip of claim 1, wherein the passive component includes at least one of an inductor and a capacitor disposed outside the charging management chip.

3. The charging management chip of claim 1, wherein the input switching circuit directly provides the power, without passing through circuit blocks in the switching charging circuit, to the direct charging circuit.

4. The charging management chip of claim 1, wherein the direct charging circuit includes a switching circuit connected between the input node and the output node and is further configured to provide the charging power while the switching circuit is turned on.

5. The charging management chip of claim 4, wherein the switching circuit of the direct charging circuit comprises:
  one or more first switches connected between the input node and the output node; and
  one or more second switches connected between the output node and a ground voltage,
  wherein the output node is connected to an output capacitor disposed outside the charging management chip, and
  the switching circuit is configured to operate as a voltage divider according to switching operations of the one or more first switches and the one or more second switches.

6. The charging management chip of claim 1, wherein the external charger includes at least one of a wired charger and a wireless charger.

7. The charging management chip of claim 6, wherein the input switching circuit includes a first input node receiving the power from the wired charger and a second input node receiving the power from the wireless charger.

8. The charging management chip of claim 7, wherein the input switching circuit further includes:
  a first input switch disposed between the first input node and the input node of the direct charging circuit; and
  a second input switch disposed between the second input node and the input node of the direct charging circuit.

9. The charging management chip of claim 8, wherein, when the charging management chip is configured to receive the power only from the wired charger, the second input node is electrically connected to the first input node, and the first input switch and the second input switch are connected to each other in parallel.

10. The charging management chip of claim 1, wherein the switching charging circuit is configured to provide the charging power through a charging path comprising the passive component disposed outside the charging management chip.

11. The charging management chip of claim 10, wherein the at least one circuit block of the switching charging circuit comprises:
  a buck control circuit comprising a first buck control switch and a second buck control switch connected between a first node of the switching charging circuit and a ground voltage, the buck control circuit being connected to one end of the passive component via a second node and being configured to control a charging operation or generation of a system voltage provided to an electronic system comprising the charging management chip; and
  a power path control circuit comprising a path control switch configured to control a transfer path of the charging power.

12. The charging management chip of claim 11, wherein when the electronic system is in an on state, the switching charging circuit is configured to generate the system voltage and the direct charging circuit is configured to provide the charging power, and
  when the electronic system is in an off state, both the switching charging circuit and the direct charging circuit are configured to provide the charging power together.

13. The charging management chip of claim 1, wherein the charging management chip is configured to receive the power via a universal serial bus (USB) Type-C connector.

14. A charging management chip comprising:
  a switching charging circuit configured to receive power from an external charger and to provide charging power according to a switching charging method;
  a direct charging circuit configured to receive the power via an input node and to provide the charging power according to a direct charging method by providing the charging power via an output node; and an input switching circuit configured to receive the power in common in the switching charging method and the direct charging method and to provide the power to at least one circuit block in the switching charging circuit and the input node of the direct charging circuit, wherein the switching charging circuit and the direct charging circuit are formed on a same semiconductor substrate, wherein the switching charging circuit includes a first node configured to bypass the power from the input switching circuit to the input node of the direct charging circuit, and wherein the input switching circuit includes:

a first input switch disposed between a first input node and the input node of the direct charging circuit and configured to switch the power from a wired charger; and a second input switch disposed between a second input node and the input node of the direct charging circuit and configured to switch the power from a wireless charger.

15. The charging management chip of claim 14, wherein, when the charging management chip receives only the power from the wired charger, the second input node is electrically connected to the first input node, and the first input switch and the second input switch are connected in parallel to each other.

16. The charging management chip of claim 14, wherein the switching charging circuit is configured to provide the charging power through a charging path comprising a passive component disposed outside the charging management chip.

17. The charging management chip of claim 16, wherein the direct charging circuit is further configured to provide the charging power without passing through the passive component.

18. The charging management chip of claim 17, wherein the passive component includes at least one of an inductor and a capacitor.

19. The charging management chip of claim 14, wherein, when a voltage of a battery which is charged by the charging power reaches a certain set level, a direct charging operation is stopped and the switching charging circuit is further configured to finely adjust a charging amount of the battery.

20. The charging management chip of claim 14, wherein the charging management chip is further configured to charge a battery through a charging profile using the switching charging circuit and the direct charging circuit, and wherein the charging profile comprises:

a first period in which, when a voltage of the battery is less than a first reference level, the battery is charged based on the switching charging method;

a second period in which, when the voltage of the battery is greater than or equal to the first reference level, the battery is charged based on the direct charging method; and a third period in which, when the voltage of the battery is greater than a second reference level, a level of current provided to the battery is reduced such that a voltage level of the battery is maintained substantially constant.

21. A charging management device comprising:

a switching charging circuit configured to receive charging power from an external charger, charge a battery according to a switching charging method and control generation of a system voltage provided to an electronic system comprising the charging management device; and a direct charging circuit configured to receive the charging power and charge the battery according to a direct charging method by providing the charging power based on a switching operation of a switching circuit therein, wherein the switching charging circuit charges the battery through a first charging path comprising an inductor, and the direct charging circuit charges the battery through a second charging path, wherein the charging management device charges the battery through a charging profile using the switching charging circuit and the direct charging circuit, and wherein the charging profile comprises:

a first period in which, when a voltage of the battery is less than a first reference level, the battery is charged based on the switching charging method;

a second period in which, when the voltage of the battery is equal to or greater than the first reference level, the battery is charged based on the direct charging method; and a third period in which, when the voltage of the battery is greater than a second reference level, a level of current provided to the battery is reduced such that a voltage level of the battery is maintained substantially constant.

22. The charging management device of claim 21, wherein the switching charging circuit passes through the charging power to an input node of the direct charging circuit.

23. The charging management device of claim 22, wherein the direct charging circuit provides the charging power, without passing through the inductor, to the battery via an output node of the direct charging circuit.

24. The charging management device of claim 21, wherein the switching charging circuit and the direct charging circuit are formed on a same semiconductor substrate.

25. The charging management device of claim 21, further comprising:

an input switching circuit configured to receive the charging power in common in the switching charging method and the direct charging method and to provide the charging power to the switching charging circuit.

26. The charging management device of claim 21, further comprising:

an over voltage protection circuit configured to receive the charging power from the external charger and provide the charging power to the switching charging circuit.

* * * * *